United States Patent
Iwai et al.

(10) Patent No.: US 9,552,619 B2
(45) Date of Patent: Jan. 24, 2017

(54) IMAGE PROCESSING APPARATUS AND IMAGE PROCESSING INTERFACE CIRCUIT

(71) Applicant: MegaChips Corporation, Osaka-shi (JP)

(72) Inventors: Shogo Iwai, Osaka (JP); Kazuma Takahashi, Osaka (JP); Nobuhiro Minami, Habikino (JP); Kensuke Uchida, Yokohama (JP); Toru Miyakoshi, Kawasaki (JP)

(73) Assignees: MegaChips Corporation, Osaka-shi (JP); Nikon Corporation, Chiyoda-ku (JP)

( * ) Notice: Subject to any disclaimer, the term of this patent is extended or adjusted under 35 U.S.C. 154(b) by 389 days.

(21) Appl. No.: 13/854,340

(22) Filed: Apr. 1, 2013

(65) Prior Publication Data

US 2014/0043343 A1 Feb. 13, 2014

(30) Foreign Application Priority Data

Aug. 8, 2012 (JP) ................................ 2012-175841
Aug. 8, 2012 (JP) ................................ 2012-175867

(51) Int. Cl.
 *G06T 1/60* (2006.01)
 *G06F 13/00* (2006.01)

(52) U.S. Cl.
 CPC ..................... *G06T 1/60* (2013.01)

(58) Field of Classification Search
 CPC ............................................... G06T 1/60
 See application file for complete search history.

(56) References Cited

U.S. PATENT DOCUMENTS

| 7,502,075 B1* | 3/2009 | Smith et al. ............ 348/571 |
| 7,587,524 B2 | 9/2009 | Cho et al. |
| 2001/0047439 A1* | 11/2001 | Daniel et al. ............ 710/52 |
| 2002/0054240 A1* | 5/2002 | Sabe .................. G06T 1/60 348/571 |

(Continued)

FOREIGN PATENT DOCUMENTS

| JP | 6-266612 | 9/1994 |
| JP | 8-287242 | 11/1996 |

(Continued)

OTHER PUBLICATIONS

"TMS320DM647/DM648 DSP External Memory Interface (EMIF) Users Guide", Texas Instruments, Literature No. SPRUEK6B, Dec. 2008.*

(Continued)

*Primary Examiner* — Sing-Wai Wu
(74) *Attorney, Agent, or Firm* — Oblon, McClelland, Maier & Neustadt, L.L.P.

(57) ABSTRACT

An image processing apparatus includes a plurality of image processing module parts, a module arbiter part, and a DMAC (Direct Memory Access Controller) part. Each of the image processing module parts includes a module core for executing a predetermined image processing. The plurality of image processing module parts is connected to the module arbiter part. The module arbiter part arbitrates memory access which is given by the plurality of image processing module parts through a bus. The DMAC part is connected between the module arbiter part and the bus, and executes memory access related to the arbitration result obtained by the module arbiter part.

23 Claims, 10 Drawing Sheets

(56) References Cited

U.S. PATENT DOCUMENTS

2003/0058348 A1* 3/2003 Hirai .................. 348/222.1
2005/0152197 A1 7/2005 Cho et al.
2007/0174506 A1* 7/2007 Tsuruta .................. 710/22

FOREIGN PATENT DOCUMENTS

| JP | 10-326342 | 12/1998 |
| --- | --- | --- |
| JP | 2005-196786 | 7/2005 |
| JP | 2006-139803 | 6/2006 |
| JP | 2007-74412 | 3/2007 |
| JP | 2008-299519 | 12/2008 |
| JP | 2012-146032 | 8/2012 |

OTHER PUBLICATIONS

Office Action issued in Japanese Application No. 2012-175867, dated Jul. 26, 2016 with partial English translation. (9 pages).
Office Action issued in Japanese Application No. 2012-175841, dated Jul. 26, 2016 with partial English translation. (8 pages).

* cited by examiner

F I G . 1
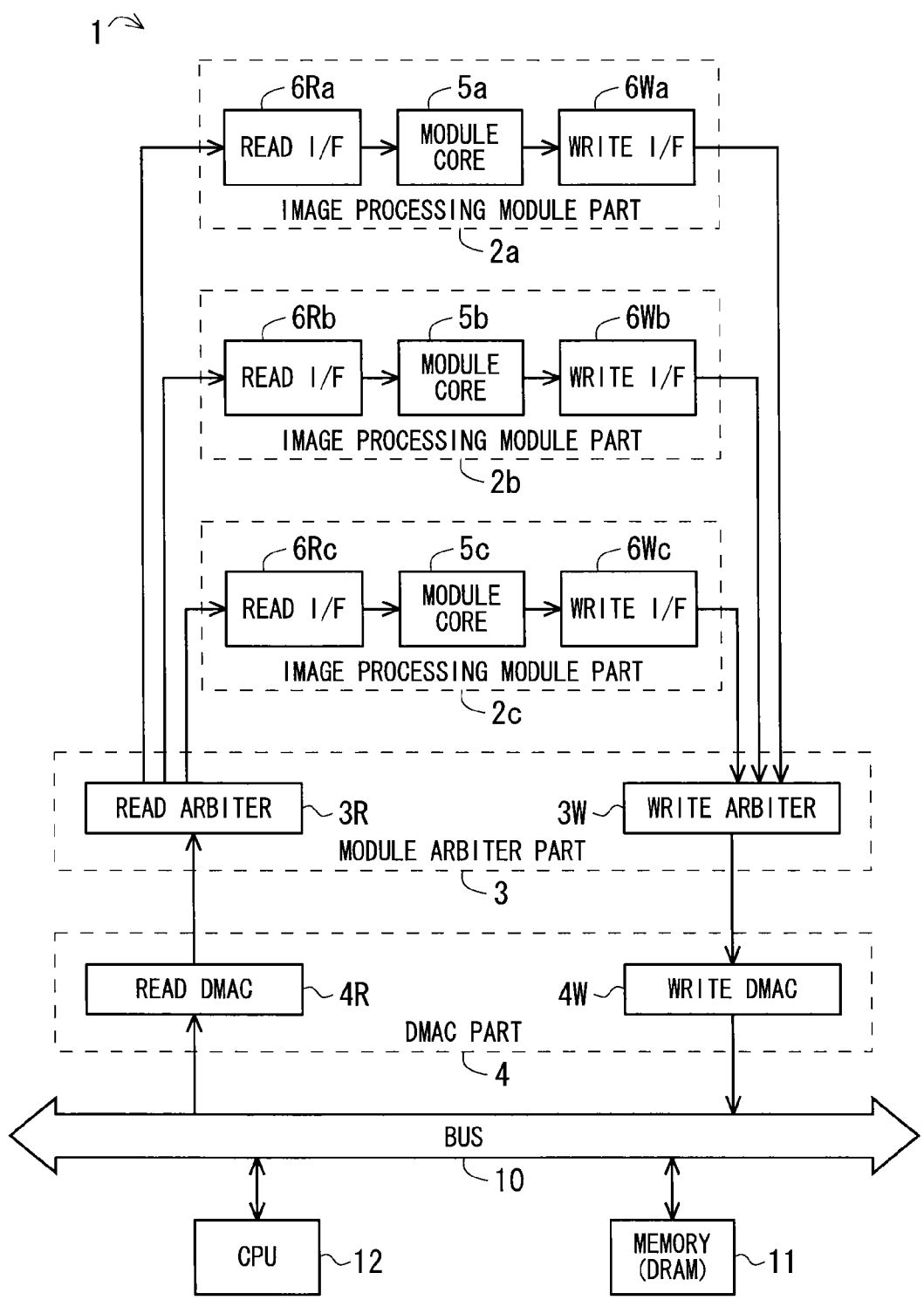

F I G. 1 1
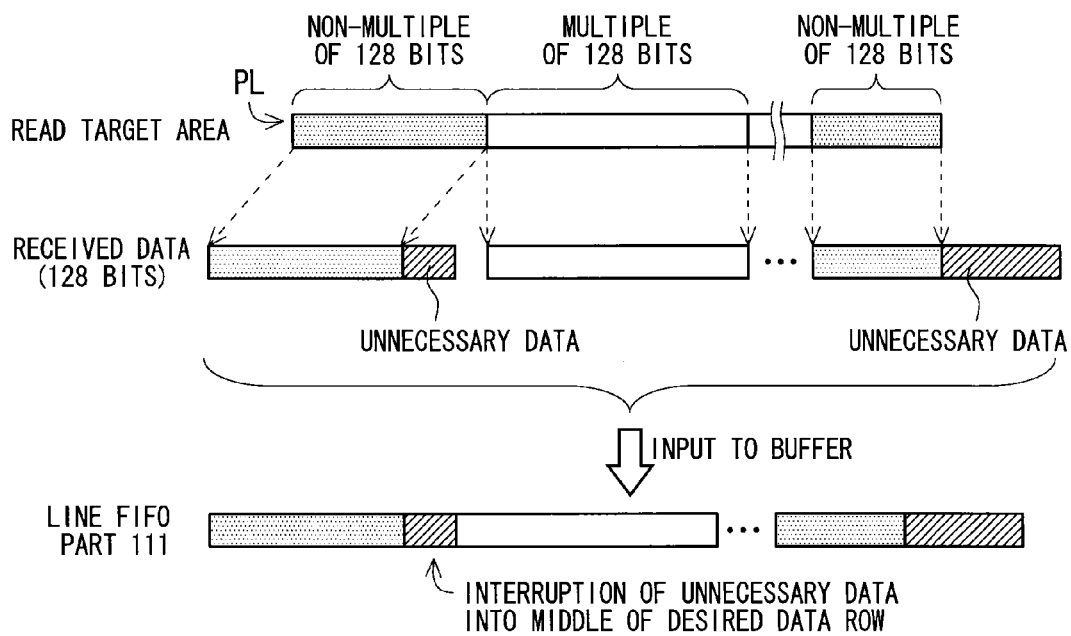
F I G. 1 2
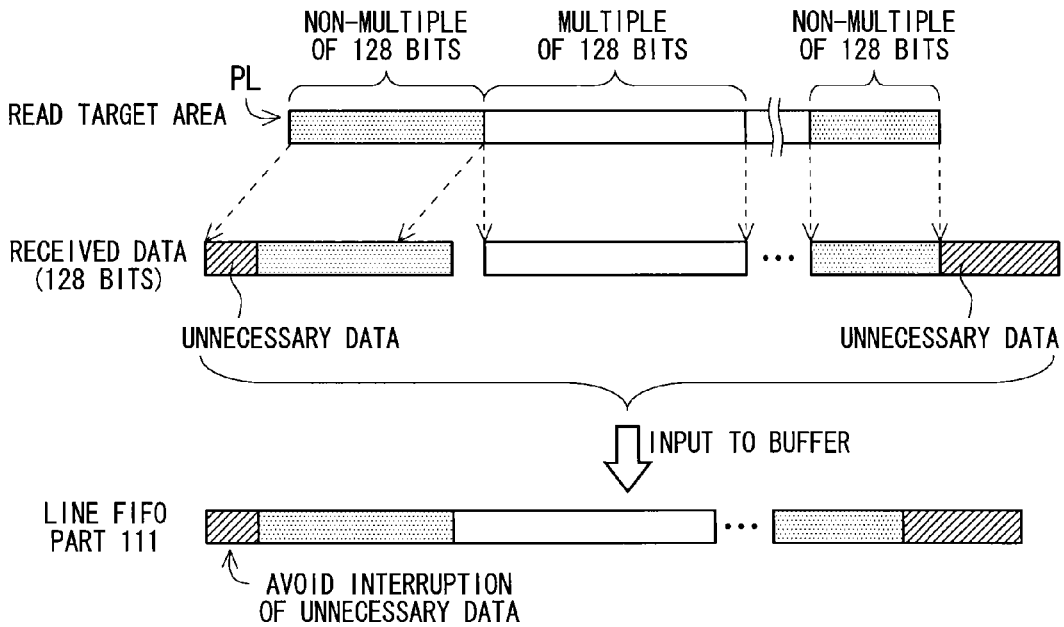

F I G . 1 3
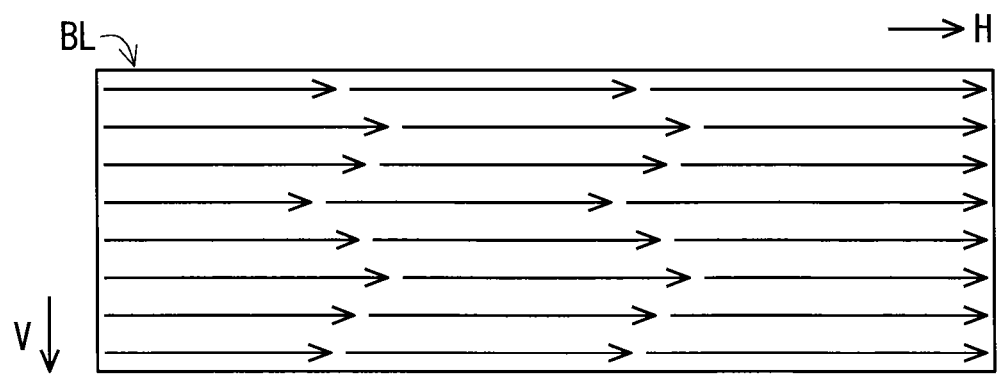

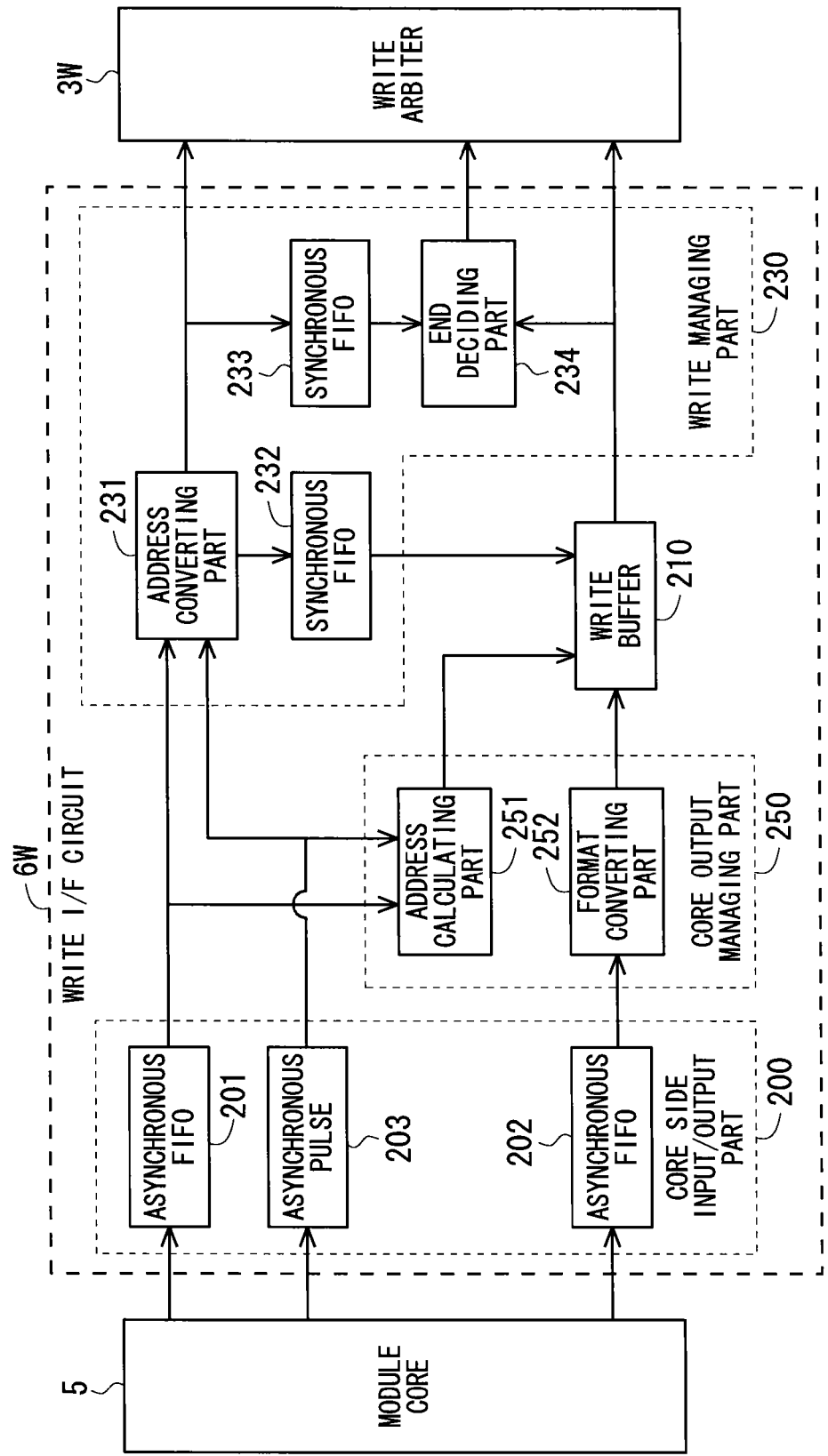

F I G . 1 5
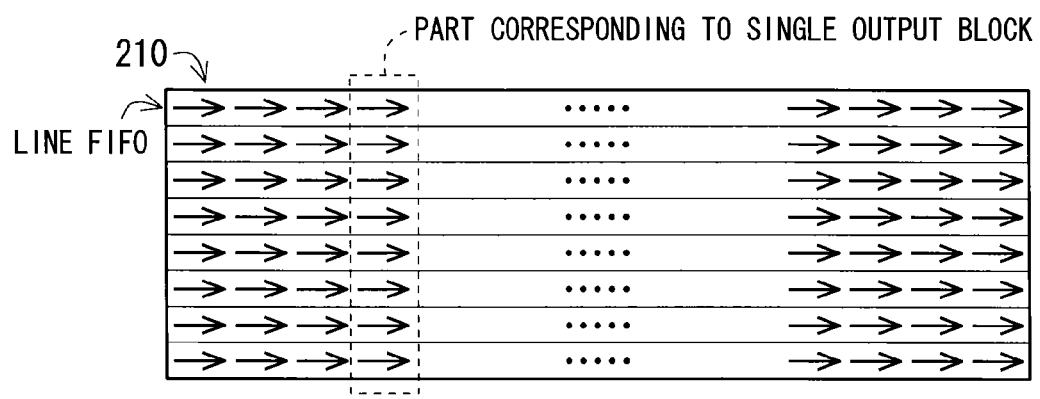
F I G . 1 6
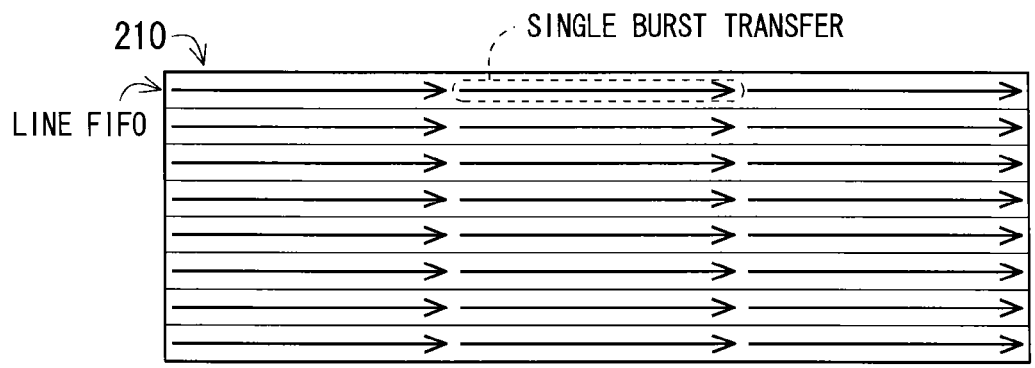

IMAGE PROCESSING APPARATUS AND IMAGE PROCESSING INTERFACE CIRCUIT

BACKGROUND OF THE INVENTION

Field of the Invention

The present invention relates to an image processing apparatus and an image processing interface circuit. The image processing interface circuit is connected to a module core for executing predetermined image processing.

Description of the Background Art

In an image processing apparatus, conventionally, a DMAC (Direct Memory Access Controller) is utilized for a data transfer between an image processing module core and a DRAM (Dynamic Random Access Memory). For instance, dedicated DMACs are connected to the respective module cores and are directly connected to buses respectively.

Moreover, there is known a module core for performing image processing on a so-called macroblock unit. For instance, it is possible to select a size of a macroblock from 16×16, 16×8, 8×16, 8×8, 8×4, 4×8, and 4×4 pixels in H.264. Such an image processing module core performs access to a DRAM, that is, reading and writing on the macroblock unit.

Moreover, Japanese Patent Application Laid-Open No. 2007-74412 discloses another example of the related art.

With the structure in which the dedicated DMAC is provided in each of the module cores, however, a large number of DMACs are present so that a chip area is increased.

When the access to the DRAM is performed on the macroblock unit, moreover, the efficiency of memory access is reduced. For instance, one line has only eight bytes in a macroblock having 4×4 pixels in 8-bit YUV422. For this reason, an ROW address of the DRAM is to be switched with reading of only eight bytes. When a read request is issued every line of the macroblock, moreover, consumption of a bus band is increased due to a large number of request issues. These respects are the same in writing.

SUMMARY OF THE INVENTION

It is an object of the present invention to provide a technique capable of implementing control of the number of DMACs, enhancement in efficiency of a bus band, and the like.

A first aspect of the present invention is directed to an image processing apparatus including a plurality of image processing module parts, each of which includes a module core for executing predetermined image processing, a module arbiter part connected to the plurality of image processing module parts and arbitrating memory access which is given by the plurality of image processing module parts through a bus, and a DMAC (Direct Memory Access Controller) part connected between the module arbiter part and the bus for executing the memory access related to the arbitration result obtained by the module arbiter part.

A second aspect of the present invention is directed to the image processing apparatus according to the first aspect, wherein the memory access includes a read request for reading input image data to be processed by the module core from an image supply source memory connected to the bus, the module arbiter part includes a read arbiter for arbitrating the read requests issued by the plurality of image processing module parts, the DMAC part includes a read DMAC for transferring the input image data in accordance with the arbitration result by utilizing a burst transfer, the module core accepts the input image data on a unit of an input block having a predetermined size, each of the plurality of image processing module parts further includes a read interface circuit having a read buffer for storing data read from the image supply source memory, a read managing part for managing a data transfer from the image supply source memory to the read buffer, and a core input managing part for supplying data stored in the read buffer to the module core on the input block unit, and the read managing part manages reading of the input image data in such a manner that a plurality of input blocks is stored in the read buffer, and determines a read target area on the image supply source memory in accordance with a predetermined reading condition in such a manner that the input image data is transferred by burst transfer.

A third aspect of the present invention is directed to the image processing apparatus according to the second aspect, wherein the input image data includes a plurality of input image data rows, each of which corresponds to a pixel line or a pixel line group, the input block is set with N (N is an integer of 2 or more) input image data rows in the plurality of input image data rows used as a target, the read buffer includes N read line FIFO (First In First Out) parts to which the N input image data rows corresponding to the input block are inputted respectively, and the predetermined reading condition includes a cyclic selecting condition that the N input image data rows are cyclically selected, an intra-row order condition that the read target area is set in order from a head side of the input image data row, and a frequency condition that the read target area is set to each of the input image data rows once every selection.

A fourth aspect of the present invention is directed to the image processing apparatus according to the second aspect, wherein the input image data includes a plurality of input image data rows, each of which corresponds to a pixel line or a pixel line group, the input block is set with a single input image data row of the plurality of input image data rows used as a target, the read buffer includes a single read line FIFO (First In First Out) part to which the single input image data row corresponding to the input block is inputted, and the predetermined reading condition includes an intra-row order condition that the read target area is set in order from a head side of the input image data row.

A fifth aspect of the present invention is directed to the image processing apparatus according to any one of the second to fourth aspects, wherein the predetermined reading condition includes a reading alignment condition that an end address of the read target area is adapted to an address alignment boundary of the image supply source memory.

A sixth aspect of the present invention is directed to the image processing apparatus according to the fifth aspect, wherein the predetermined reading condition includes a read size condition that a start address of the read target area is set in such a manner that a data volume of the read target area is a multiple of a bus width of the bus if the read target area contains a start edge of the input image data row.

A seventh aspect of the present invention is directed to the image processing apparatus according to the sixth aspect, wherein the predetermined reading condition includes a first end address condition that an end address of the read target area is set in adaptation to a maximum transfer amount which can be set by a single burst transfer if an unread part in the input image data row exceeds the maximum transfer amount of the single burst transfer and if an amount of excess is larger than a difference between the start address set on the read size condition and a head address of the input image data row, and a second end address condition that the end address of the read target area is set to an end edge address of the input image data row if the amount of excess is equal to or smaller than the difference.

An eighth aspect of the present invention is directed to the image processing apparatus according to any one of the second to seventh aspects, wherein the predetermined reading condition includes a third end address condition that an end address of the read target area is set to be an end edge address of the input image data row if an unread part of the input image data row is equal to or smaller than the maximum transfer amount of the burst transfer.

A ninth aspect of the present invention is directed to the image processing apparatus according to any one of the second to eighth aspects, wherein the read buffer includes at least one read line FIFO (First In First Out) part having a capacity which is larger than the maximum transfer amount of the burst transfer and is smaller than a double, and the read managing part stores, in the read line FIFO part, new data read from the image supply source memory in place of supplied data to the module core if the supplied data is equal to or larger than the maximum transfer amount in the read line FIFO part.

A tenth aspect of the present invention is directed to the image processing apparatus according to any one of the first to ninth aspects, wherein the memory access includes a write request for writing core output data to be outputted from the module core to an image storage destination memory connected to the bus, the module arbiter part includes a write arbiter for arbitrating the write requests issued by the plurality of image processing module parts, the DMAC part includes a write DMAC for transferring the core output data in accordance with the arbitration result by utilizing a burst transfer, each of the plurality of image processing module parts further includes a write interface circuit having a write buffer for storing the core output data, a core output managing part for managing an input of the core output data to the write buffer, and a write managing part for managing a transfer of data stored in the write buffer to the image storage destination memory, the write buffer includes at least one write line FIFO (First In First Out) part having a larger capacity than a maximum transfer amount which can be set by a single burst transfer, and the write managing part determines write target data to be a target of the burst transfer in data in the write line FIFO part and a write destination area on the image storage destination memory in accordance with a predetermined writing condition every write line FIFO part.

An eleventh aspect of the present invention is directed to the image processing apparatus according to the tenth aspect, wherein the predetermined writing condition includes at least one of a writing size condition that the write target data is set to the maximum transfer amount of the burst transfer, and a write alignment condition that the write destination area is adapted to an address alignment boundary of the image storage destination memory.

A twelfth aspect of the present invention is directed to the image processing apparatus according to the tenth or eleventh aspect, wherein the predetermined writing condition includes a line end edge condition that the write target data is divided within a range up to the core output data corresponding to an end edge of a pixel line or a pixel line group of an output image to be outputted from the module core, and the write destination area is set corresponding to the range thus divided.

A thirteenth aspect of the present invention is directed to the image processing apparatus according to any one of the tenth to twelfth aspects, wherein the write line FIFO part has a capacity which is larger than the maximum transfer amount of the burst transfer and is smaller than a double, and the write managing part stores, in the write line FIFO part, new core output data in place of transferred data to the image storage destination memory if the transferred data is equal to or larger than the maximum transfer amount in the write line FIFO part.

A fourteenth aspect of the present invention is directed to an image processing interface circuit to be connected to a module core for executing a predetermined image processing, including a read buffer for storing data read from an image supply source memory connected to a bus, a read managing part for managing a data transfer from the image supply source memory to the read buffer, and a core input managing part for supplying data stored in the read buffer to the module core on a unit of an input block having a predetermined size, wherein the read managing part manages reading of input image data to be processed by the module core in such a manner that a plurality of input blocks is stored in the read buffer, and determines a read target area on the image supply source memory in accordance with a predetermined reading condition in such a manner that the input image data is transferred by burst transfer.

A fifteenth aspect of the present invention is directed to the image processing interface circuit according to the fourteenth aspect, wherein the input image data includes a plurality of input image data rows, each of which corresponds to a pixel line or a pixel line group, the input block is set with N (N is an integer of 2 or more) input image data rows in the plurality of input image data rows used as a target, the read buffer includes N read line FIFO (First In First Out) parts to which the N input image data rows having the input block set thereto are inputted respectively, and the predetermined reading condition includes a cyclic selecting condition that the N input image data rows are cyclically selected, an intra-row order condition that the read target area is set in order from a head side of the input image data row, and a frequency condition that the read target area is set to each of the input image data rows once every selection.

A sixteenth aspect of the present invention is directed to the image processing interface circuit according to the fourteenth aspect, wherein the input image data includes a plurality of input image data rows, each of which corresponds to a pixel line or a pixel line group, the input block is set with a single input image data row of the input image data rows used as a target, the read buffer includes a single read line FIFO (First In First Out) part to which the single input image data row corresponding to the input block is inputted, and the predetermined reading condition includes an intra-row order condition that the read target area is set in order from a head side of the input image data row.

A seventeenth aspect of the present invention is directed to the image processing interface circuit according to any one of the fourteenth to sixteenth aspects, wherein the predetermined reading condition includes a reading alignment condition that an end address of the read target area is adapted to an address alignment boundary of the image supply source memory.

An eighteenth aspect of the present invention is directed to the image processing interface circuit according to the seventeenth aspect, wherein the predetermined reading condition includes a read size condition that a start address of the read target area is set in such a manner that a data volume of the read target area is a multiple of a bus width of the bus if the read target area contains a start edge of the input image data row.

A nineteenth aspect of the present invention is directed to the image processing interface circuit according to the eighteenth aspect, wherein the predetermined reading condition includes a first end address condition that an end address of the read target area is set in adaptation to a maximum transfer amount which can be set by a single burst transfer if an unread part in the input image data row exceeds the maximum transfer amount of the single burst transfer and if an amount of excess is larger than a difference between the start address set on the read size condition and a head address of the input image data row, and a second end address condition that the end address of the read target area is set to an end edge address of the input image data row if the amount of excess is equal to or smaller than the difference.

A twentieth aspect of the present invention is directed to the image processing interface circuit according to any one of the fourteenth to nineteenth aspects, wherein the predetermined reading condition includes a third end address condition that an end address of the read target area is set to be an end edge address of the input image data row if an unread part of the input image data row is equal to or smaller than the maximum transfer amount of the burst transfer.

A twenty-first aspect of the present invention is directed to the image processing interface circuit according to any one of the fourteenth to twentieth aspects, wherein the read buffer includes at least one read line FIFO (First In First Out) part having a capacity which is larger than the maximum transfer amount of the burst transfer and is smaller than a double, and the read managing part stores, in the read line FIFO part, new data read from the image supply source memory in place of supplied data to the module core if the supplied data is equal to or larger than the maximum transfer amount in the read line FIFO part.

A twenty-second aspect of the present invention is directed to an image processing interface circuit to be connected to a module core for executing a predetermined image processing, including a write buffer for storing core output data to be outputted from the module core, a core output managing part for managing an input of the core output data to the write buffer, and a write managing part for managing a transfer of data stored in the write buffer to an image storage destination memory connected to a bus, wherein the write buffer includes at least one write line FIFO (First In First Out) part having a larger capacity than a maximum transfer amount which can be set by a single burst transfer, and the write managing part determines write target data to be a target of the burst transfer in data in the write line FIFO part and a write destination area on the image storage destination memory in accordance with a predetermined writing condition every write line FIFO part.

A twenty-third aspect of the present invention is directed to the image processing interface circuit according to the twenty-second aspect, wherein the predetermined writing condition includes at least one of a writing size condition that the write target data is set to the maximum transfer amount of the burst transfer, and a write alignment condition that the write destination area is adapted to an address alignment boundary of the image storage destination memory.

A twenty-fourth aspect of the present invention is directed to the image processing interface circuit according to the twenty-second or twenty-third aspect, wherein the predetermined writing condition includes a line end edge condition that the write target data is divided within a range up to the core output data corresponding to an end edge of a pixel line or a pixel line group of an output image to be outputted from the module core, and the write destination area is set corresponding to the range thus divided.

A twenty-fifth aspect of the present invention is directed to the image processing interface circuit according to any one of the twenty-second to twenty-fourth aspects, wherein the write line FIFO part has a capacity which is larger than the maximum transfer amount of the burst transfer and is smaller than a double, and the write managing part stores, in the write line FIFO part, new core output data in place of transferred data to the image storage destination memory if the transferred data is equal to or larger than the maximum transfer amount in the write line FIFO part.

According to the first to thirteenth aspects, the plurality of image processing module parts shares the DMAC part. Therefore, as compared with the structure in which the DMAC is provided for each of the image processing module parts, the number of the DMAC parts is decreased. Consequently, a chip area can be reduced. As a result, it is possible to implement reduction in a size of the apparatus, electric power saving, and the like.

According to the second to thirteenth aspects, the input blocks corresponding to plural times are previously read onto the buffer and the burst transfer is utilized for the reading. Therefore, as compared with a structure in which the input block is read every time it is required for the module core, it is possible to suppress a frequency of the read request issued by each image processing module part. Consequently, a bus band can be utilized efficiently.

According to the second to thirteenth aspects, with the suppression of the frequency of the read request issued by the image processing module part, there is reduced a necessity for causing the read arbiter to perform band adjustment to be performed by an existing so-called bus arbiter (which is connected to a bus and arbitrates a right of use of the bus). Accordingly, a simpler algorithm than the bus arbiter can be employed for the read arbiter. As a result, it is possible to constitute the read arbiter on a small scale.

According to the third to thirteenth aspects, N input image data rows are read partially in parallel, and furthermore, such reading progresses in order from the head side of the N input image data rows. Therefore, as compared with the case where one of the input image data rows is read from a head to an end edge and the reading of the other input image data row is then started, a delay of data supply to the module core is not caused easily. In other words, in the latter case, a time required for supplying the input block set to a headmost side to the module core is almost equal to a time required for reading the whole N input image data rows, for instance. On the other hand, according to the partial reading in parallel, the input block on a tipmost side can be completely supplied to the module core even if the reading of the whole N input image data rows is not waited. According to the partial reading in parallel, moreover, it is possible to reduce the capacity of the read buffer.

According to the fifth to thirteenth aspects, it is possible to operate the image supply source memory more efficiently as compared with the case where the read target area is provided across the address alignment boundary of the image supply source memory. Consequently, it is possible to contribute to enhancement in data transfer efficiency, electric power saving, and the like.

According to the sixth to thirteenth aspects, in the case where the read target area includes the start edge of the input image data row, particularly, it is possible to fill up a back with significant data for the input image data in the received bit string. In other words, the adjustment of the start address of the read target area causes unnecessary data to be included in the received bit string. However, the unnecessary data can be disposed intentionally ahead of the received bit string. Accordingly, it is possible to avoid an interruption of the unnecessary data into the input image data read onto the buffer. Therefore, it is easy to manage and remove the unnecessary data. Specifically, it is sufficient that top data depending on the amount of the adjustment of the read start address in the output data of the buffer is disregarded in the supply of the data to the module core.

According to the seventh to thirteenth aspects, the maximum data volume which can be transferred can be ensured at a single read request. For this reason, it is possible to efficiently perform the data transfer by suppressing an increase in the number of the read requests. Moreover, the frequency of the read request is suppressed with enhancement in the efficiency of the data transfer. Therefore, it is possible to reduce a processing load of the read arbiter.

According to the seventh to thirteenth aspects, if the unread part in the input image data row exceeds the maximum transfer amount of the burst transfer and if the amount of the excess is equal to or smaller than a difference between the start address set on the read size condition and the head address of the input image data row, the end address of the read target area is set to the end edge address of the input image data row. Consequently, the number of the read requests is uniform for each input image data row. From this viewpoint, therefore, it is possible to implement the suppression of the frequency of the read request and the reduction in the processing load of the read arbiter.

According to the eighth to thirteenth aspects, it is possible to suppress the unnecessary transfer operation for the reading of the end edge side part in the input image data row. Accordingly, it is possible to efficiently utilize a bus band.

According to the ninth to thirteenth aspects, it is possible to reduce the capacity of the read buffer. Consequently, it is possible to implement reduction in a chip area, decrease in a size of the apparatus, electric power saving, and the like.

According to the tenth to thirteenth aspects, the plurality of output blocks are stored in the buffer, and are collected and burst transferred to the image storage destination memory. Accordingly, as compared with the structure in which an output block is transferred to the image storage destination memory every time the output block is outputted from the module core, it is possible to suppress the frequency of a write request through each image processing module part. Consequently, it is possible to efficiently utilize a bus band.

According to the tenth to thirteenth aspects, with the suppression of the frequency of the write request issued by the image processing module part, there is reduced a necessity for causing the write arbiter to perform band adjustment to be performed by an existing so-called bus arbiter (which is connected to a bus and arbitrates a right of use of the bus). Accordingly, a simpler algorithm than the bus arbiter can be employed for the write arbiter. As a result, it is possible to constitute the write arbiter on a small scale.

According to the eleventh to thirteenth aspects, depending on the write size condition, it is possible to write a maximum data volume at a single write request. Therefore, it is possible to efficiently perform the data transfer. Moreover, the frequency of the write request is suppressed with enhancement in the efficiency of the data transfer. Therefore, it is possible to reduce the processing load of the write arbiter. Depending on the write alignment condition, furthermore, it is possible to operate the image storage destination memory more efficiently as compared with the case where the write destination area is provided across the address alignment boundary of the image storage destination memory. Consequently, it is possible to contribute to enhancement in data transfer efficiency, electric power saving, and the like.

According to the twelfth to thirteenth aspects, an unnecessary transfer operation can be suppressed for the writing of a line end edge side part. Accordingly, it is possible to efficiently utilize the bus band.

According to the thirteenth aspect, it is possible to reduce the capacity of the write buffer. Consequently, it is possible to implement reduction in a chip area, decrease in a size of the apparatus, electric power saving, and the like.

According to the fourteenth to twenty-first aspects, the input blocks corresponding to plural times are previously read onto the buffer and the burst transfer is utilized for the reading. Therefore, as compared with a structure in which the input block is read every time it is required for the module core, it is possible to suppress a frequency of the read request. Consequently, a bus band can be utilized efficiently.

According to the fifteenth to twenty-first aspects, N input image data rows are read partially in parallel, and furthermore, such reading progresses in order from the head side of the N input image data rows. Therefore, as compared with the case where one of the input image data rows is read from a head to an end edge and the reading of the other input image data row is then started, a delay of data supply to the module core is not caused easily. In other words, in the latter case, a time required for supplying the input block set to a headmost side to the module core is almost equal to a time required for reading the whole N input image data rows, for instance. On the other hand, according to the partial reading in parallel, the input block on a tipmost side can be completely supplied to the module core even if the reading of the whole N input image data rows is not waited. According to the partial reading in parallel, moreover, it is possible to reduce the capacity of the read buffer.

According to the seventeenth to twenty-first aspects, it is possible to operate the image supply source memory more efficiently as compared with the case where the read target area is provided across the address alignment boundary of the image supply source memory. Consequently, it is possible to contribute to enhancement in data transfer efficiency, electric power saving, and the like.

According to the eighteenth to twenty-first aspects, in the case where the read target area includes the start edge of the input image data row, particularly, it is possible to fill up a back with significant data for the input image data in the received bit string. In other words, the adjustment of the start address of the read target area causes the unnecessary data to be included in the received bit string. However, the unnecessary data can be disposed intentionally ahead of the received bit string. Accordingly, it is possible to avoid an interruption of the unnecessary data into the input image data read onto the buffer. Therefore, it is easy to manage and remove the unnecessary data. Specifically, it is sufficient that top data depending on the amount of the adjustment of the read start address in the output data of the buffer is disregarded in the supply of the data to the module core.

According to the nineteenth to twenty-first aspects, the maximum data volume which can be transferred can be ensured at a single read request. For this reason, it is possible to efficiently perform the data transfer by suppressing an increase in the number of the read requests. Moreover, the frequency of the read request is suppressed with enhancement in the efficiency of the data transfer.

According to the nineteenth to twenty-first aspects, if the unread part in the input image data row exceeds the maximum transfer amount of the burst transfer and if the amount of the excess is equal to or smaller than a difference between the start address set on the read size condition and the head address of the input image data row, the end address of the read target area is set to the end edge address of the input image data row. Consequently, the number of the read requests is uniform for each input image data row. From this viewpoint, therefore, it is possible to implement the suppression of the frequency of the read request.

According to the twenty to twenty-first aspects, it is possible to suppress the unnecessary transfer operation for the reading of the end edge side part in the input image data row. Accordingly, it is possible to efficiently utilize a bus band.

According to the twenty-first aspect, it is possible to reduce the capacity of the read buffer. Consequently, it is possible to implement reduction in a chip area, decrease in a size of the apparatus, electric power saving, and the like.

According to the twenty-two to twenty-fifth aspects, the plurality of output blocks are stored in the buffer, and are collected and burst transferred to the image storage destination memory. Accordingly, as compared with the structure in which an output block is transferred to the image storage destination memory every time the output block is outputted from the module core, it is possible to suppress the frequency of a write request. Consequently, it is possible to efficiently utilize a bus band.

According to the twenty-third to twenty-fifth aspects, depending on the write size condition, it is possible to write a maximum data volume at a single write request. Therefore, it is possible to efficiently perform the data transfer. Moreover, the frequency of the write request is suppressed with enhancement in the efficiency of the data transfer. Depending on the write alignment condition, furthermore, it is possible to operate the image storage destination memory more efficiently as compared with the case where the write destination area is provided across the address alignment boundary of the image storage destination memory. Consequently, it is possible to contribute to enhancement in data transfer efficiency, electric power saving, and the like.

According to the twenty-fourth to twenty-fifth aspects, an unnecessary transfer operation can be suppressed for the writing of a line end edge side part. Accordingly, it is possible to efficiently utilize the bus band.

According to the twenty-fifth aspect, it is possible to reduce the capacity of the write buffer. Consequently, it is possible to implement reduction in a chip area, decrease in a size of the apparatus, electric power saving, and the like.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram illustrating an image processing apparatus;

FIG. 11 is a diagram for explaining a problem in a case where a read target area is not a multiple of a bus width;

FIG. 12 is a diagram for explaining a solution in the case where the read target area is not the multiple of the bus width;

FIG. 13 is a diagram illustrating reading of data from an image supply source memory;

FIG. 14 is a block diagram illustrating a read I/F circuit;

FIG. 15 is a diagram illustrating a data input to a write buffer; and

FIG. 16 is a diagram illustrating a data fetch from the write buffer.

DESCRIPTION OF THE PREFERRED EMBODIMENTS

<Whole Structure>

Figure 2:
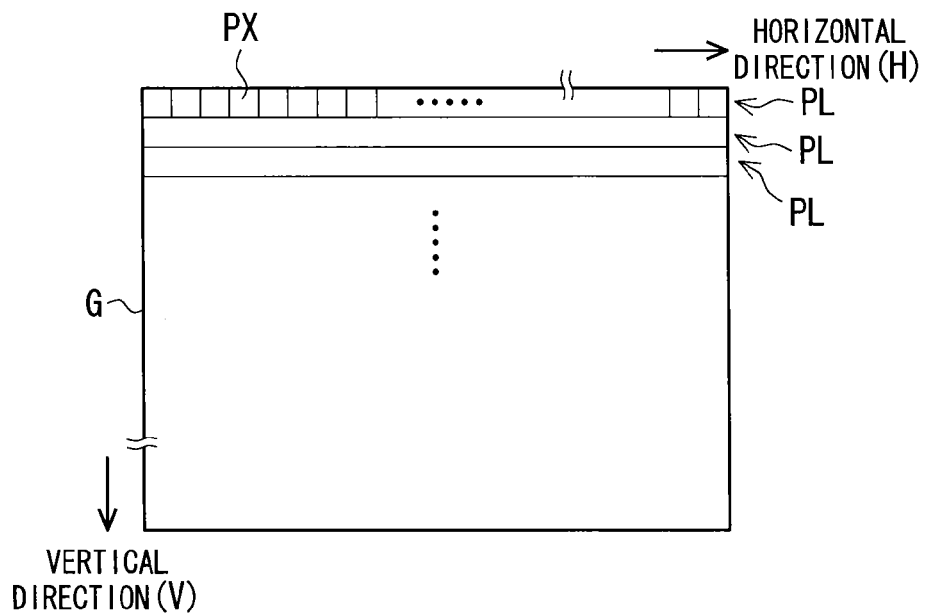
FIG. 2 is a diagram for explaining a pixel and a pixel line.

FIG. 1 is a block diagram illustrating an image processing apparatus 1 according to a preferred embodiment. According to the example of FIG. 1, the image processing apparatus 1 includes a plurality of image processing module parts 2, a module arbiter part 3, a DMAC (Direct Memory Access Controller) part 4, a bus 10, a memory 11, and a CPU 12. Although three image processing module parts 2 are illustrated, the present invention is not restricted to this example. Moreover, it is assumed that the reference numerals 2a, 2b and 2c are used in a case where the three image processing module parts 2 are distinguished from each other. Such a notation is used for other elements in some cases.

The image processing module part 2a includes a module core 5a, a read interface (I/F) circuit 6Ra to be a reading image processing interface circuit, and a write interface (I/F) circuit 6Wa to be a writing image processing interface circuit. Similarly, the image processing module parts 2b and 2c include module cores 5b and 5c, read I/F circuits 6Rb and 6Rc, and write I/F circuits 6Wb and 6Wc, respectively. Moreover, the module arbiter part 3 includes a read arbiter 3R and a write arbiter 3W. Furthermore, the DMAC part 4 includes a read DMAC 4R and a write DMAC 4W.

As shown in FIG. 1, the module core 5a is connected to the read I/F circuit 6Ra, and similarly, the module cores 5b and 5c are connected to the read I/F circuits 6Rb and 6Rc respectively. All the three read I/F circuits 6Ra, 6Rb and 6Rc are connected to the read arbiter 3R. The read arbiter 3R is connected to the read DMAC 4R and the read DMAC 4R is connected to the bus 10.

Moreover, the module core 5a is connected to the write I/F circuit 6Wa, and similarly, the module cores 5b and 5c are connected to the write I/F circuits 6Wb and 6Wc respectively. All the three write I/F circuits 6Wa, 6Wb and 6Wc are connected to the write arbiter 3W. The write arbiter 3W is connected to the write DMAC 4W and the write DMAC 4W is connected to the bus 10.

In other words, the three image processing module parts 2a, 2b and 2c are connected to the module arbiter part 3, the module arbiter part 3 is connected to the DMAC part 4, and the DMAC part 4 is connected to the bus 10. In this case, the DMAC part 4 is connected between the module arbiter part 3 and the bus 10.

The module core 5 executes predetermined image processing (for instance, compression, decompression, an affine transformation, various corrections and the like) over input image data and outputs the processed data as output image data. In other words, the module core 5 generates output image data from the input image data through the predetermined image processing.

The module core 5 accepts the input image data on a unit of an input block having a predetermined size, executes image processing for the accepted input block, and outputs the processed data as core output data. The core output data is also referred to as an output block corresponding to the input block. The input block is constituted by a single data row in some cases and is constituted as an aggregate of data rows in the other cases. The same thing is true for the output block.

The image processing contents of the module cores 5a, 5b and 5c may be different from each other or at least two of the module cores 5a, 5b and 5c may perform image processing of the same type or contents. An existing module core, for instance, a module core to be provided as a so-called IP (Intellectual Property) core can be utilized for the module core 5.

The read I/F circuit 6R executes read processing for reading input image data to be processed by the module core 5 from the memory 11 and supplying the input image data to the module core 5 on the input block unit. Moreover, the write I/F circuit 6W executes write processing for receiving an output block from the module core 5 and writing the output block as output image data to the memory 11.

The module arbiter part 3 arbitrates access of the image processing module parts 2a, 2b and 2c to the memory 11.

More specifically, the read arbiter 3R accepts, from the three read I/F circuits 6R, read requests to be given to the memory 11, arbitrates them in accordance with a predetermined arbitration method, and transfers a read request selected by the arbitration to the read DMAC 4R. The read request is accompanied by information for specifying a read target area on the memory 11.

Moreover, the write arbiter 3W accepts, from the three write I/F circuits 6W, write requests to be given to the memory 11, arbitrates them in accordance with a predetermined arbitration method, and transfers a read request selected by the arbitration to the write DMAC 4W. The write request is accompanied by write target data and information for specifying a write destination area on the memory 11.

There will be described a case where the read target area is specified by a start address and an end address, and will also be described a case where the write destination area is specified by a start address and an end address. Note that, the present invention is not restricted to this example. For instance, it is also possible to specify the read target area and the write destination area depending on the start address and an area length thereof.

As the arbitration method through the arbiters 3R and 3W, a round robin method will now be described. In the round robin method, plural types of prioritizations are previously prepared between memory access requests (which are indicated as RQa, RQb and RQc) of the image processing module parts 2a, 2b and 2c. When the arbitration is performed based on one of the prioritizations, the prioritization to be used is switched.

More specifically, for instance, there are previously prepared three types of prioritizations, that is, (i) RQa>RQb>RQc, (ii) RQb>RQc>RQa, and (iii) RQc>RQa>RQb. Referring to RQa>RQb, it is assumed that RQa has a higher priority than RQb, for instance. In a state where the prioritization of (i) is valid, it is assumed that RQa and RQc compete with each other. In this case, RQa having a higher priority is selected in accordance with the (i). Thus, a prioritization in which the selected RQa is defined to be the least significant, that is, the (ii) is set to be valid in next arbitration.

Another arbitration method may be employed for the arbiters 3R and 3W. Herein, the round robin method is an example of simple algorithms. Therefore, the arbiters 3R and 3W can be constituted on a small scale.

The DMAC part 4 executes memory access related to a result of the arbitration obtained by the module arbiter part 3.

Specifically, the read DMAC 4R has a bus interface (I/F) conforming to a predetermined bus specification (that is, a bus protocol). The read DMAC 4R controls the bus I/F in accordance with the read request transferred from the read arbiter 3R. Consequently, data is read from the read target area of the memory 11 which is designated in accordance with the read request. The read DMAC 4R transfers the read data to the read I/F circuit 6R issuing the read request.

Moreover, the write DMAC 4W also has the bus I/F, and the write DMAC 4W controls the bus I/F in accordance with the write request transferred from the write arbiter 3W. More specifically, the write DMAC 4W controls the bus I/F in such a manner that the write target data related to the write request is stored in a write destination area designated in accordance with the write request.

For explanation, there will now be described a case where the bus I/Fs of the DMACs 4R and 4W conform to AXI (Advanced eXtensible Interface). The present invention is not restricted to this example. According to the AXI, it is possible to perform a burst transfer. Transfer control information about the AXI includes a burst length, a burst size and the like. Specifically, the burst length represents the number of data transfers to be performed in a single burst transfer, and any of 1 to 16 data transfer(s) can be set basically in respect of specifications. Moreover, the burst size represents a maximum transfer amount in each data transfer during the single burst transfer, and any of 1, 2, 4, 8, 16, 32, 64 and 128 byte(s) can be set in respect of the specifications.

The bus 10 includes a data bus, an address bus, a control bus and the like, for instance. There will now be described a case where the data bus has a width of 128 bits. In this case, a maximum burst size which can be set is 16 bytes (128 bits). In the AXI, the bus is referred to as a channel in some cases.

The memory 11 stores image data to be inputted to the image processing module part 2, image data outputted from the image processing module part 2, and the like. For this reason, the memory 11 functions as an image supply source memory for supplying input image data, and furthermore, an image storage destination memory for storing output image data. The image supply source memory and the image storage destination memory may be constituted by separate components.

There will now be described a case where the memory 11 is a DRAM (Dynamic Random Access Memory), and the memory 11 will also be referred to as a DRAM 11 hereafter. Moreover, there will be described a case where the DRAM 11 is aligned in 32 bytes, that is, the DRAM 11 has a 32-byte boundary. However, the present invention is not restricted to these examples.

The CPU 12 wholly controls the image processing apparatus 1. For instance, the CPU 12 instructs the image processing module part 2 to execute image processing and offers necessary information for the execution.

Another module, for instance, a module for offering an interface for external connection (an external storage, a display device or the like) may be connected to the bus 10.

Although the image processing apparatus 1 can be provided as an image integrated circuit which is integrated into one chip, moreover, the present invention is not restricted to the example. In addition, the image processing apparatus 1 can be changed variously. For instance, as a variation, the CPU 12 is omitted from the image processing apparatus 1 and an external CPU may be connected to the image processing apparatus 1. Furthermore, at least one of the memory 11 and the bus 10 may be omitted from the image processing apparatus 1 in place of the CPU 12 or together with the CPU 12.

According to the image processing apparatus 1, the three image processing module parts 2a, 2b and 2c share the DMAC part 4. Therefore, as compared with the structure in which the DMAC part 4 is provided for each of the image processing module parts 2a, 2b and 2c, therefore, the number of the DMAC parts 4 is decreased. Consequently, a chip area can be reduced. As a result, it is possible to implement reduction in a size of the apparatus, electric power saving, and the like.

<Explanation of Image or the Like>

Before more specific description of the image processing apparatus 1, an image or the like will be explained. FIG. 2 illustrates a square image G, and two sides of the square which are orthogonal to each other are caused to correspond to a horizontal direction (that is, a transverse direction) H and a vertical direction (that is, a longitudinal direction) V respectively for easy understanding of the explanation. The image G may be vertically long differently from the example of FIG. 2. It is assumed that the horizontal direction H of the image G corresponds to an ROW line direction of the DRAM 11.

As shown in FIG. 2, the image G is grasped as an aggregate of pixels PX. In FIG. 2, the pixels PX are aligned in both the horizontal direction H and the vertical direction V. In other words, the pixels PX are disposed in a matrix.

A group of the pixels PX arranged in the horizontal direction H will be referred to as a pixel line PL. In this case, the respective pixel lines PL are extended in the horizontal direction H in the image G, and the pixel lines PL are arranged in the vertical direction V. In the image G, moreover, the pixel lines PL each have an equal length (that is, the same number of pixels), and a position of a start edge of the pixel line PL (which is assumed to be a left end) is aligned and a position of an end edge (which is assumed to be a right end) is also aligned.

Figure 3:
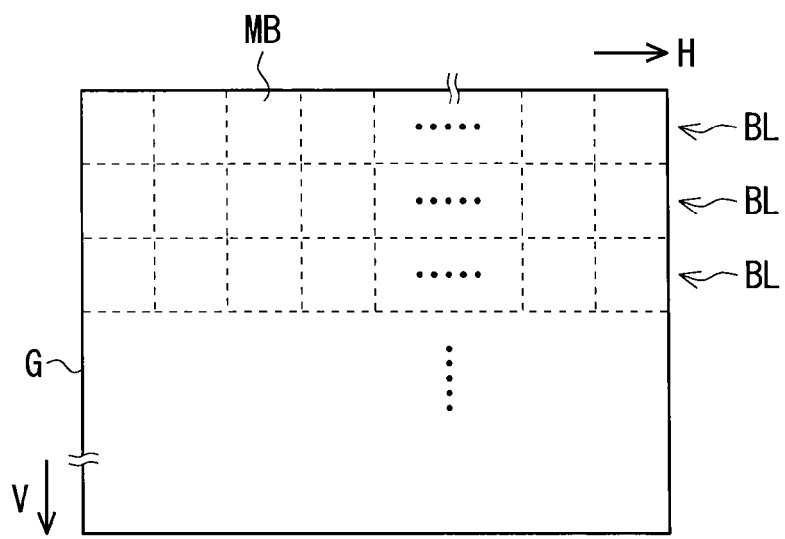
FIG. 3 is a diagram for explaining a macroblock and a block line.
Figure 4:
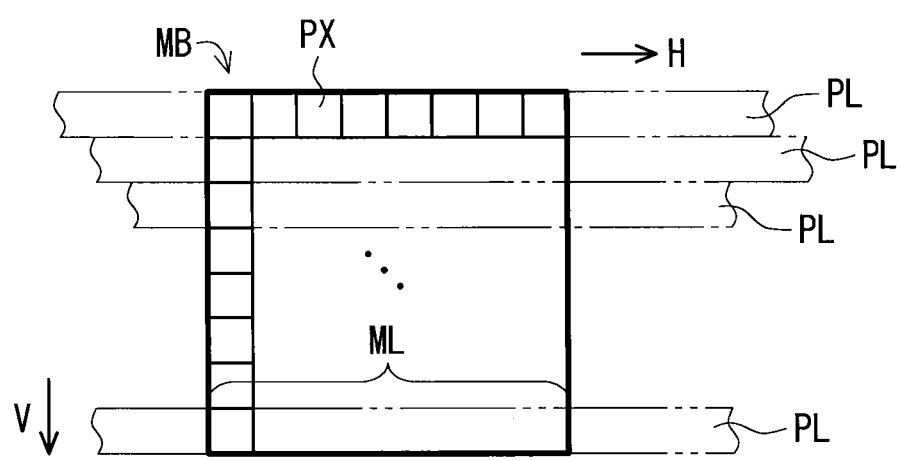
FIG. 4 is a diagram for explaining the macroblock and an intra-block pixel line.

As shown in FIGS. 3 and 4, a macroblock MB to be a group of the pixels PX is set to the image G. In an example of FIG. 4, the macroblock MB is constituted by 8 pixels which are continuous in the horizontal direction H×8 pixels which are continuous in the vertical direction V. A size of the macroblock MB is not restricted to this example. For instance, it is possible to select the size of the macroblock from 16×16, 16×8, 8×16, 8×4, 4×8, and 4×4 pixels in H.264.

As shown in FIG. 3, the macroblocks MB are set to be adjacent to each other with a left and upper corner of the image G used as a start point (that is, an origin). Consequently, the macroblocks MB are set in a matrix to the image G.

A group of the pixels PX arranged in the horizontal direction H in the macroblock MB, that is, a part of the pixel line PL present in the macroblock MB will be referred to as an intra-block pixel line ML (see FIG. 4). Moreover, a group of the macroblocks MB arranged in the horizontal direction H will be referred to as a block line BL (see FIG. 3).

For easy explanation, there will be described a case where a width (a size in the horizontal direction H) and a height (a size in the vertical direction V) of the image G are multiples of those of the macroblock MB. In other words, in the description in which the macroblock MB has a size of a width of 8 pixels×a height of 8 pixels, it is assumed that both of the numbers of the pixels in the horizontal direction H and the vertical direction V in the image G are multiples of eight.

In a case where the number of the pixels of the image G is not the multiple of eight in at least one of the horizontal direction H and the vertical direction V, a small image which does not satisfy the size of the macroblock MB is generated if the image G is divided on the macroblock MB unit. The small image is enlarged to have the size of the macroblock MB through padding of dummy data and is thus used for image processing, for instance.

In the case where the image G is grasped as the aggregate of the pixels PX as described above, data of the image G can be managed as an aggregate of image data (that is, pixel data) for each pixel PX.

On the other hand, pixel data is converted into data in another predetermined format and image data is constituted by the converted data in some cases. For instance, image data subjected to compression processing is taken.

The compression processing is performed on the macroblock MB unit set to a pixel (that is, pixel data), and stream data (that is, sequential data) is generated for each macroblock MB. For this reason, the image data subjected to the compression or the like is grasped as an aggregate of the stream data, and is grasped to have a structure in which each macroblock MB is decided as the stream data in FIG. 3, for instance.

In the case where the image data is constituted by the pixel data, a data row formed by the pixel data arranged in the horizontal direction H corresponds to the single pixel line PL. In the case where the image data is constituted by predetermined stream data, moreover, a data row formed by the stream data arranged in the horizontal direction H corresponds to a predetermined number (which is included in the macroblock MB) of pixel lines PL, that is, a group of the pixel lines PL.

<Plural Line Mode and Single Line Mode>

Here, a case where an input block of the module core 5 is the macroblock MB, that is, the input block is set to a plurality of pixel lines PL, thereby including a plurality of data rows (each of which corresponds to the pixel line PL) will be referred to as a plural line mode.

On the other hand, a case where the input block of the module core 5 is predetermined stream data, that is, the input block is constituted by a single data row will be referred to as a single line mode.

Referring to an output block of the module core 5, similarly, a plural line mode and a single line mode are defined.

A specific example of the read I/F circuit 6R and the write I/F circuit 6W will be described below, and the case where both of the input and the output of the module core 5 are set to the plural line mode will be mainly taken as an example. For instance, processing such as a correction of a pixel value, a resize of an image, or the like corresponds thereto. The case where the input is set to the plural line mode and the output is set to the single line mode (for instance, the compression processing) and the case where the input is set to the single line mode and the output is set to the plural line mode (for instance, the decompression processing) will also be fully understood from the following description.

<Read I/F Circuit 6R>

Figure 5:
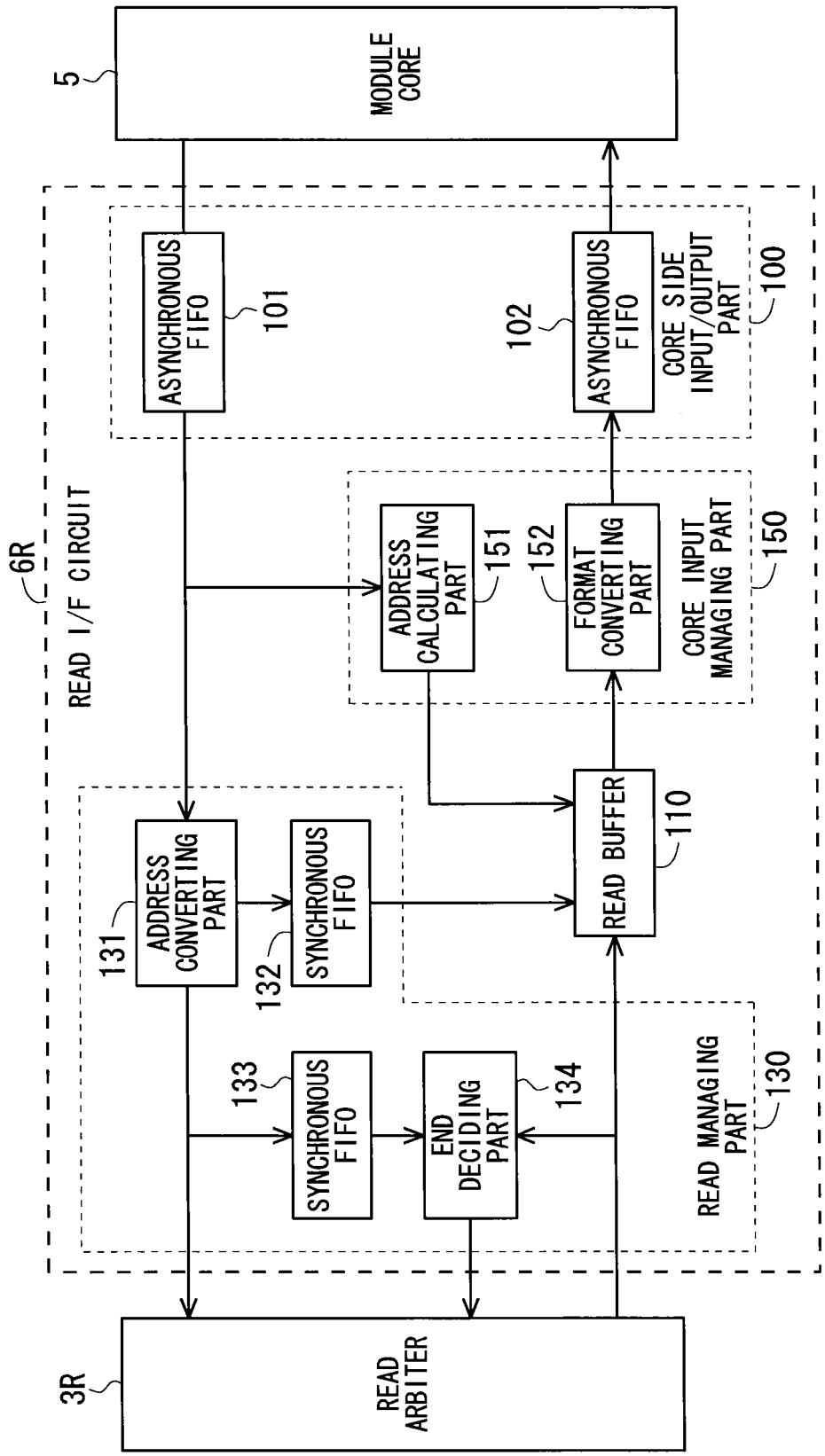
FIG. 5 is a block diagram illustrating a read I/F circuit.

FIG. 5 is a block diagram illustrating the read I/F circuit 6R. According to an example of FIG. 5, the read I/F circuit 6R includes a core side input/output part 100, a read buffer 110, a read managing part 130, and a core input managing part 150.

<Core Side Input Part 100>

The core side input/output part 100 is provided depending on an example in which a clock frequency of the read I/F circuit 6R is synchronous with that of the read arbiter 3R, while it is asynchronous with a clock frequency of the module core 5. For this reason, in the case where the clock frequency of the read I/F circuit 6R is synchronous with that of the module core 5, the core side input/output part 100 can be omitted. According to the example of FIG. 5, the core side input/output part 100 includes an asynchronous FIFO (First In First Out) part 101 for input and an asynchronous FIFO part 102 for output.

<Read Buffer 110>

Figure 6:
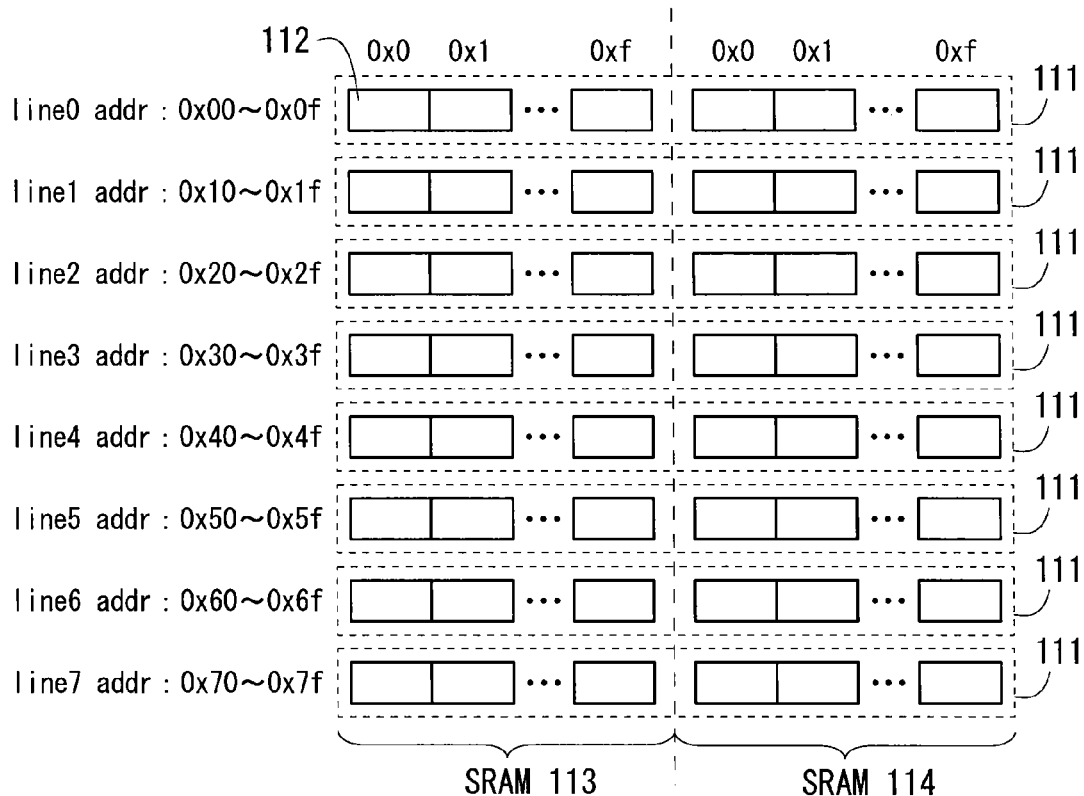
FIG. 6 is a diagram illustrating a buffer of the read I/F circuit.

The read buffer 110 is utilized for temporarily storing data read from the DRAM 11. In an example of FIG. 6, the read buffer 110 has eight read line FIFO parts 111. The eight read line FIFO parts 111 are assigned to eight pixel lines PL to which the macroblock MB (that is, the input block) is set, respectively. Specifically, data on an i-th pixel line PL from a top in the macroblock MB is stored in the i-th read line FIFO part 111 with i of 0 to 7.

The number of the line FIFO parts 111 is equal to or larger than that of the pixel lines PL to which the macroblock MB is set. For instance, if 16 line FIFO parts 111 are provided, they can correspond to 16 pixel lines PL at a maximum, and predetermined eight ones of the line FIFO parts 111 are used to enable correspondence to the macroblock MB corresponding to eight pixel lines PL. Moreover, the same thing is true for the single line mode.

Each line FIFO part 111 has 32 storage areas 112. The number of the storage areas 112 per line FIFO part 111 is selected to be Z times as large as a maximum number of times (16 times in AXI) of a data transfer which can be set in a single burst transfer. Although Z=2 is set, the present invention is not restricted thereto (which will be described below).

Moreover, a capacity of the single storage area 112 is basically selected to be 16 bytes (128 bits) which are equal to a data bus width (that is, a maximum burst size which can be set in respect of a hardware design). In this case, the single line FIFO part 111 can store data corresponding to two burst transfers at a maximum. In an example which will be described below, the capacity of the single storage area 112 is expanded into 132 bits (=128 bits+4 bits).

In the case of 8-bit YUV422, an image data volume corresponding to eight pixels, that is, an image data volume corresponding to a single intra-block pixel line ML is 16 bytes. Accordingly, it is possible to store data corresponding to a single intra-block pixel line ML in the single storage area 112, and to store data corresponding to a single macroblock MB in eight storage areas 112 (one of the storage areas 112 is used in each of 0th to 7th line FIFO parts 111). In other words, the whole read buffer 110 can store data on 32 macroblocks MB.

There will now be described a case where the read buffer 110 is constituted by two SRAMs (Static Random Access Memories) 113 and 114, that is, a double buffer structure is employed. Note that, it is also possible to constitute the read buffer 110 by a single SRAM or at least three SRAMs or to also utilize a memory other than the SRAM.

The single storage area 112 is assigned to one of addresses of the SRAMs 113 and 114. For this reason, it is possible to store 16-byte data in the single address. Data corresponding to the single address is read/written in a lump. In this case, the SRAMs 113 and 114 have a word length of 16 bytes.

Moreover, each line FIFO part 111 is constituted by 16 storage areas 112 in the SRAM 113 (which have continuous addresses) and 16 storage areas 112 in the SRAM 114 (the same addresses for the 16 storage areas 112 in the SRAM 113 are prepared). Writing to the 16 storage areas 112 in the SRAM 113 is performed cyclically in ascending order of the address and reading is also performed in the same manner. Consequently, FIFO is implemented. The same thing is true for the 16 storage areas 112 in the SRAM 114.

It is possible to independently execute access to the SRAM 113 and access to the SRAM 114. For this reason, it is possible to perform reading over one of the SRAMs 113 and 114 while performing the writing over the other SRAM. In the case where the access to the same SRAMs collides, it is preferable to give priority to writing and to cause reading to wait for one cycle, for instance.

Figure 7:
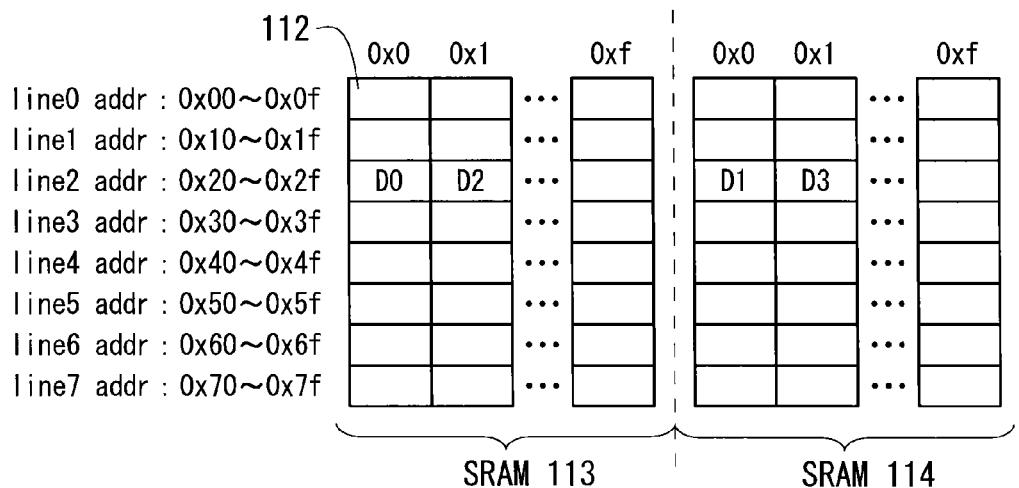
FIG. 7 is a diagram illustrating writing and reading in a double buffer structure.

FIG. 7 shows an example in which data is written with alternately switching of the SRAMs 113 and 114. In other words, 0th data D0 is written to the SRAM 113, first data D1 is written to the SRAM 114, second data D2 is written to the SRAM 113, and third data D3 are written to the SRAM 114. Consequently, it is possible to read the data D0 from the SRAM 113 while writing the data D1 to the SRAM 114, for instance.

As a matter of course, it is also possible to continuously write data to the 16 storage areas 112 of the SRAM 13 and to then switch a write destination into the SRAM 114.

<Read Managing Part 130>

The read managing part 130 manages a data transfer from the DRAM 11 memory to the read buffer 110. According to the example of FIG. 5, the read managing part 130 includes an address converting part 131, synchronous FIFO parts 132 and 133, and an end deciding part 134.

The address converting part 131 acquires necessary information for reading input image data (which will hereinafter be referred to as read basic information) from the module core 5 through the asynchronous FIFO part 101. The read basic information includes a start address and an end address of an area of the DRAM 11 in which the input image data is stored, a size of the macroblock MB (that is, an input block of the module core 5), the number of the macroblocks MB in the image horizontal direction H, and the like, for instance.

The address converting part 131 determines a read target area on the DRAM 11 (more specifically, a start address and an end address of the area) based on the read basic information thus acquired. In this case, the read target area is determined in accordance with a predetermined reading condition in such a manner that the input image data is subjected to a burst transfer to the read buffer 110. A determining method will be described below in detail.

The address converting part 131 inputs, to the read arbiter 3R, the start address and the end address of the read target area together with a read request. Then, the read DMAC 4R performs a burst transfer of data on the read target area from the DRAM 11 to the read buffer 110 through the read arbiter 3R, based on the start address and the end address of the read target area which are acquired through the read arbiter 3R.

Moreover, the address converting part 131 issues write control for the read buffer 110 in response to a read request at each time. The write control is inputted to the synchronous FIFO part 132 and is utilized when data related to a corresponding read request are to be stored in the read buffer 110. Consequently, data on the i-th pixel line PL in the macroblock MB can be stored in the corresponding i-th line FIFO part 111, for instance.

Furthermore, the address converting part 131 inputs a data size of the read target area to the synchronous FIFO part 133 in response to a read request at each time. The data size is utilized for detecting the end of the reading in response to the read request at each time in the end deciding part 134. More specifically, the end deciding part 134 counts the number of bytes of data to be read from the DRAM 11 through the read arbiter 3R and inputted to the read buffer 110, decides that reading of a desirable read target area is ended if the count value is coincident with the data size inputted to the synchronous FIFO part 133, and inputs the notice to the read arbiter 3R.

If the address converting part 131 decides that the end address of the read target area which is determined reaches the end address of the input image data, the address converting part 131 inputs a result of the decision to the synchronous FIFO part 133. The end deciding part 134 knows that the reading is ended for the whole input image data through the acquisition of the result of the decision from the synchronous FIFO part 133, and inputs the notice to the read arbiter 3R.

<Core Input Managing Part 150>

The core input managing part 150 supplies the data stored in the read buffer 110 to the module core 5 on an input block unit (herein, a macroblock unit). According to the example of FIG. 5, the core input managing part 150 includes an address calculating part 151 and a format converting part 152.

The address calculating part 151 acquires the read basic information from the module core 5 and controls the reading of the data from the read buffer 110 based on the basic information. Specifically, the 0th to 7th line FIFO parts 111 are cyclically selected, and at the same time, an address in the read buffer 110 is designated in such a manner that data having a number of bytes corresponding to a single intra-block pixel line ML is read from the selected line FIFO part 111.

If a single reading operation is performed, basically, each storage area 112 of the line FIFO part 111 can discard or overwrite the stored data. In some cases, desired data is extended over two storage areas 112, and it is necessary to prepare for the case. Specifically, there is a possibility that the storage area 112 storing a back side part of the desired data might hold a part of unread data together. For instance, therefore, it is preferable to delete only a read part of the data stored in the storage area 112.

The format converting part 152 converts data read from the read buffer 110 into a predetermined format which is suitable for the input of the module core 5. For instance, there is executed a processing for dividing a 128-bit data outputted from the read buffer 110 into a predetermined bit width. Data outputted from the format converting part 152 is supplied to the module core 5 through the asynchronous FIFO part 102.

<Effect Obtained by Read I/F Circuit 6R>

The read I/F circuit 6R previously reads input blocks corresponding to plural times onto the read buffer 110, and sequentially supplies the input blocks to the module core 5. In addition, the read target area of the DRAM 11 is determined in such a manner that the burst transfer is utilized for reading the input block. Therefore, as compared with a structure in which the input block is read every time it is required for the module core 5, it is possible to suppress a frequency of the read request issued by each image processing module part 2. Consequently, a bus band can be utilized efficiently.

With the suppression of the frequency of the read request issued by the image processing module part 2, moreover, there is reduced a necessity for causing the read arbiter 3R to perform band adjustment to be performed by an existing so-called bus arbiter (which is connected to a bus and arbitrates a right of use of the bus). Accordingly, a simpler algorithm than the bus arbiter can be employed for the read arbiter 3R. As a result, it is possible to constitute the read arbiter 3R on a small scale.

<Reading of Data Through Read I/F Circuit 6R>

Figure 8:
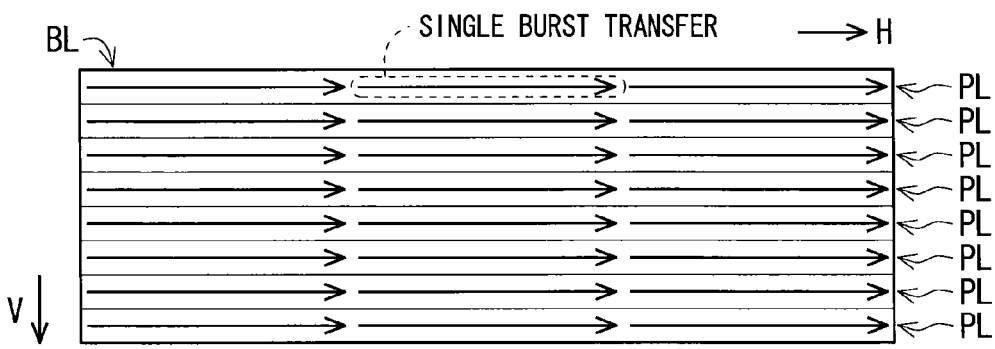
FIGS. 8 to 10 are diagrams each illustrating reading of data from an image supply source memory.
Figure 9:
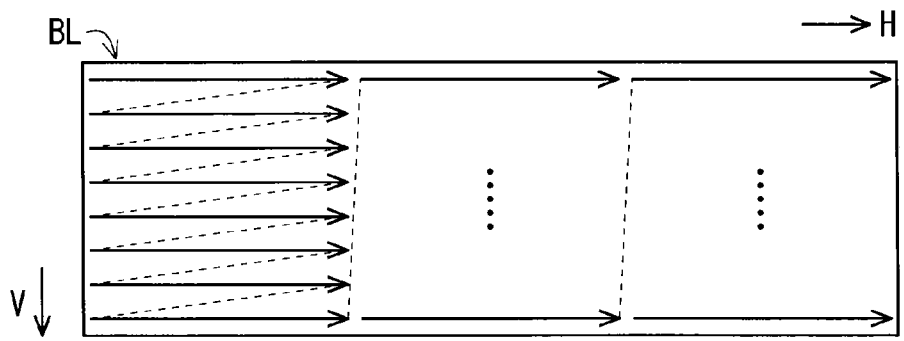

FIG. 8 schematically shows a state where the read I/F circuit 6R reads data from the DRAM 11. As is illustrated in FIGS. 8 and 9, the read I/F circuit 6R performs the reading by setting, as a target, the block line BL to be a group of the macroblocks MB.

Specifically, each pixel line PL in the block line BL is turned from a start edge (herein, a left end) toward an end edge (herein, a right end) to repeat the burst transfer. As shown in FIG. 9 corresponding to FIG. 8, particularly, the burst transfer is performed from the start edge of the –0th pixel line PL from a top and is subsequently performed from the start edge of the first pixel line PL. Then, second to seventh pixel lines PL are selected in order and the burst transfer is performed from the start edge of each of the pixel lines PL. Thereafter the 0th pixel line PL is returned and the burst transfer is performed from a head of a part which has not been read. Next, the burst transfer is performed from the head of a part of the first pixel line PL which has not been read. In the following, the whole block line BL is read in the same manner.

Although FIG. 8 illustrates the case where the reading of pixel data corresponding to a single pixel line PL is completed by a three-time burst transfer, the present invention is not restricted to this example.

In this case, a one-time burst transfer is basically set to a maximum transfer amount which can be set. In the case of the image processing apparatus 1, 256-byte data at a maximum can be transferred with a 16-byte (128-bit) burst size and a 16-time burst length.

A target of a burst transfer at each time, that is, a read target area in the DRAM 11 is set by the read managing part 130 (more specifically, the address converting part 131) as described above. In this case, the read managing part 130 performs the reading illustrated in FIGS. 8 and 9 in accordance with the following reading conditions.

The read managing part 130 sequentially determines the read target area in accordance with a condition (a cyclic selecting condition) that eight input image data rows corresponding to eight pixel lines PL in the block line BL are to be selected cyclically, a condition (an intra-row order condition) that a read target area is to be set in order from a head side of the input image data row, and a condition (a frequency condition) that the read target area is set to each input image data row once every selection.

According to the reading method illustrated in FIGS. 8 and 9, eight input image data rows corresponding to eight pixel lines PL are read partially in parallel, and furthermore, such reading progresses in order from the head side of the eight input image data rows.

Therefore, as compared with the case where one of the pixel lines PL is read from a head to an end edge and the reading of the other pixel line PL is then started, a delay of data supply to the module core 5 is not caused easily. In other words, in the latter case, a time required for supplying the macroblock MB set to a headmost side to the module core 5 is almost equal to a time required for reading the whole eight pixel lines PL, that is, the whole block line BL, for instance.

On the other hand, according to the partial reading in parallel shown in FIGS. 8 and 9, the macroblock MB on a tipmost side can be completely supplied to the module core 5 even if the reading of the whole eight pixel lines PL is not waited.

According to the partial reading in parallel, moreover, it is possible to reduce the capacity of the read buffer 110.

It is preferable to take an address alignment of the DRAM 11 into consideration in the setting of the read target area. The reason is that the operation of the DRAM 11 can be made efficient. For a reading condition related to this respect, there is employed a condition (a read alignment condition) that the end address of the read target area is adapted to an address alignment boundary (herein, a 32-byte boundary) of the DRAM 11.

According to the read alignment condition, in the case where a certain start address is given, the end address can be calculated in accordance with {(start address &0x1f)+255 bytes}.

By employing the read alignment condition, it is possible to operate the DRAM 11 more efficiently as compared with the case where the read target area is provided across the address alignment boundary of the DRAM 11. Consequently, it is possible to contribute to enhancement in data transfer efficiency, electric power saving, and the like.

Figure 10:
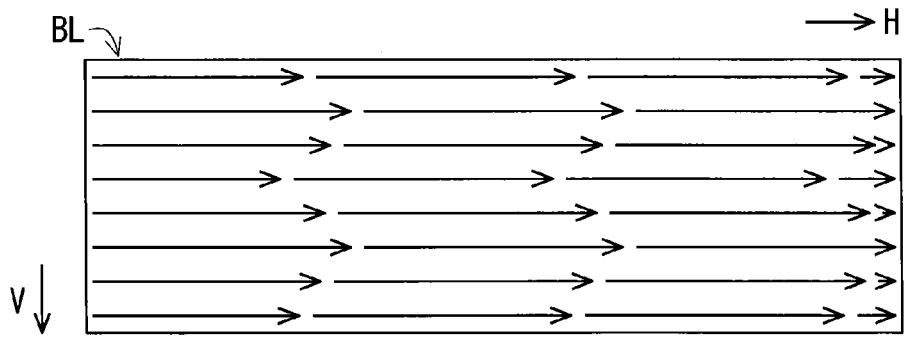

In some cases in which the end address of the read target area is adjusted in accordance with the read alignment condition, the read target area is shorter than 256 bytes in a first burst transfer and a last burst transfer in the pixel line PL as shown in FIG. 10. In those cases, setting of a burst length is adjusted by the read DMAC 4R, for instance.

As a result of shortening of the read target area, the read target area is not a multiple of the bus width (herein, 128 bits) in some cases. In consideration of a respect in which the read I/F circuit 6R receives data on a bus width unit from the bus 10, in a case where the read target area is not the multiple of the bus width, unnecessary data which is not intended as the read target area is also picked up together from the bus 10 as shown in FIG. 11. In particular, the unnecessary data is included in a terminal part of a received bit string. When the data is exactly inputted to the read buffer 110, the unnecessary data breaks into a part between the read target area and a next read target area as shown in FIG. 11. It is desirable that the core input managing part 150 (more specifically, the address calculating part 151) does not supply the unnecessary data to the module core 5. For this purpose, however, a position and a size of the unnecessary data are required to be managed, which is complicated.

In the case where the read target area includes the start edge of the pixel line PL, therefore, the read managing part 130 utilizes a condition (a read size condition) that a start address of the read target area is set in such a manner that a data volume of the read target area is the multiple of the bus width. As shown in FIG. 12, consequently, it is possible to fill up a front with the unnecessary data in the received bit string. In other words, it is possible to fill up a back with significant data for the input image data in the received bit string. More specifically, the adjustment of the start address of the read target area causes the unnecessary data to be included in the received bit string. However, the unnecessary data can be disposed intentionally ahead of the received bit string.

As shown in FIG. 12, accordingly, it is possible to avoid an interruption of the unnecessary data into a data row corresponding to the single pixel line PL. Therefore, it is easy to manage and remove the unnecessary data. Specifically, it is sufficient that the core input managing part 150 disregards top data depending on the amount of the adjustment of the read start address in a data row corresponding to each pixel line PL. The amount of the adjustment is given an amount of masking with the 0x1f in accordance with the read alignment condition, that is, low order five bits of the start address before an application of the read alignment condition.

More specifically, four bits for storing the amount of the adjustment of the read start address is provided before 128 bits for storing the read data in the storage area 112 of the line FIFO part 111. In the core input managing part 150, the address calculating part 151 or the format converting part 152 can distinguish presence of unnecessary data and a size of the unnecessary data (that is, a data volume which is not supplied to the module core 5 in 128 bits subsequent to four bits) by referring to top four bits of each storage area 112.

As shown in FIG. 12, the read target area is shortened also on the end edge side of the pixel line PL. As a result, the read target area is not the multiple of the bus width in some cases. Referring to the end edge side of the pixel line PL, there is no particular problem even if the unnecessary data is present in a terminal part of a received bit string. The reason is as follows. It is preferable to disregard a subsequent bit outputted from the storage area 112 in a stage in which a data volume to be supplied to the module core 5 reaches a single pixel line PL, for instance. As a result, it is possible to automatically remove the unnecessary data.

Next, a description will be given to a condition (an end address condition) related to the setting of the end address of the read target area. The end address of the read target area is basically set into the start address+255 bytes. As described above, the end address is given in {(start address &0x1f)+ 255 bytes} in consideration of the address alignment boundary of the DRAM 11 on the read alignment condition.

In a case where an unread part in the pixel line PL is equal to or smaller than a maximum transfer amount (herein, 256 bytes) of the burst transfer, moreover, the end address of the read target area is set to be the end edge address of the pixel line PL. FIGS. 8 and 9 show an example in which the last read target area of the pixel line PL also corresponds to the maximum transfer amount. In the case where the last read target area is smaller than the maximum transfer amount, particularly, it is preferable to set the end address in adaptation to the size of the read target area. Consequently, referring to the reading of the end edge side part of the pixel line PL, it is possible to suppress an unnecessary transfer operation. Accordingly, it is possible to efficiently utilize a bus band.

On the other hand, also in some cases in which the unread part of the pixel line PL is larger than the maximum transfer amount which can be set by the one-time burst transfer, it is preferable to set the end address of the read target area into the end edge address of the pixel line PL. Specifically, in the case where the last read target area of the pixel line PL is small as shown in FIG. 10, the issuance of a read request to read the small area is inefficient. In the case where a large number of small areas are present, particularly, efficiency is reduced greatly.

If the unread part in the pixel line PL exceeds the maximum transfer amount which can be set by the one-time burst transfer and if the amount of the excess is larger than a difference between the start address set on the read size condition and the head address of the pixel line PL, the end address of the read target area is set in adaptation to the maximum transfer amount in the same manner as the basic end address condition. The difference is equivalent to the amount of the adjustment of the start address on the read alignment condition.

Consequently, the maximum data volume which can be transferred can be ensured at a single read request. For this reason, it is possible to efficiently perform the data transfer by suppressing an increase in the number of the read requests. Moreover, the frequency of the read request is suppressed with enhancement of the efficiency of the data transfer. Therefore, it is possible to reduce a processing load of the read arbiter.

On the other hand, in the case where the amount of the excess is equal to or smaller than the difference, the end address of the read target area is set to be the end edge address of the pixel line PL. Consequently, it is possible to prevent the small area from being generated as shown in FIG. 13. In this case, moreover, data in the small area can also be ensured at the single read request in addition to the maximum data volume which can be subjected to the burst transfer. As shown in FIG. 13, furthermore, the number of the read requests is uniform for each pixel line PL. As a result, it is possible to efficiently perform the data transfer by suppressing the increase in the number of the read requests. In addition, the frequency of the read request is suppressed with the enhancement in the efficiency of the data transfer. Therefore, it is possible to reduce the processing load of the read arbiter.

According to the end address condition in the case where the amount of the excess is equal to or smaller than the difference, the read request is given beyond the data volume which can be set by the single burst transfer. Also in this case, division into two burst transfers or more is performed by the read DMAC 4R. On the other hand, in order to store the read data, it is required that at least 17 storage areas 112 can be accepted in the line FIFO part 111. For this reason, it is preferable to utilize the end address condition together with confirmation of a vacant state of the line FIFO part 111.

<Write I/F Circuit 6W>

FIG. 14 is a block diagram illustrating the write I/F circuit 6W. According to an example of FIG. 14, the write I/F circuit 6W includes a core side input/output part 200, a write buffer 210, a write managing part 230, and a core output managing part 250.

<Core Side Input Part 200>

The core side input/output part 200 is provided for the same purpose as the core side input/output part 100 of the read IN circuit 6R (see FIG. 5). According to the example of FIG. 14, the core side input/output part 200 includes asynchronous FIFO parts 201 and 202 and an asynchronous pulse part 203 for input.

<Write Buffer 210>

The write buffer 210 is utilized for temporarily storing core output data (that is, an output block) which are outputted from the module core 5. There will be described a case where the write buffer 210 has eight write line FIFO parts constituted by two SRAMs in the same manner as the read buffer 110 of the read I/F circuit 6R. In this case, the eight write line FIFO parts are assigned to eight pixel lines PL in an output block respectively in the same manner as the read buffer 110.

There will be described a case where the number of the pixel lines PL included in the output block is equal to that of the pixel lines PL to which an input block is set. For instance, in the case where the module core 5 performs resize processing for reducing an image in the vertical direction V, the number of the pixel lines PL corresponding to the output block is smaller than that of the pixel lines PL corresponding to the input block. To the contrary, in the resize processing for enlarging the image in the vertical direction V, the number of the pixel lines PL corresponding to the output block is larger than that of the pixel lines PL corresponding to the input block.

<Core Output Managing Part 250>

The core output managing part 250 manages an input of the core output data to the write buffer 210. According to the example of FIG. 14, the core output managing part 250 includes an address calculating part 251 and a format converting part 252.

The core output data is inputted from the module core 5 to the format converting part 252 through the asynchronous FIFO part 202. The format converting part 252 converts core output data constituted in a predetermined format into a suitable format for the input of the write buffer 210. For instance, a bit string of the core output data is converted into a one-word (128-bit) unit of the write buffer 210.

The address calculating part 251 controls any address of the write buffer 210 in which the output data of the format converting part 252 is to be stored. Specifically, the address calculating part 251 acquires necessary information for writing output image data to the DRAM 11 (which will be hereinafter referred to as write basic information) from the module core 5 through the asynchronous FIFO part 201. The write basic information includes a start address and an end address in a storage destination area of output image data in the DRAM 11, a size of the output block of the module core 5 (that is, the macroblock MB on the output side), the number of the output blocks in the image horizontal direction H, and the like, for instance.

The information about the number of the output blocks in the image horizontal direction H serves as an index of an end edge position of the pixel line PL. The module core 5 may output the notice to the address calculating part 251 through the asynchronous pulse part 203 when outputting data on the end edge of the pixel line PL, for instance.

<Write Managing Part 230>

The write managing part 230 manages the transfer of the data stored in the write buffer 210 to the DRAM 11. According to the example of FIG. 14, the write managing part 230 includes an address converting part 231, synchronous FIFO parts 232 and 233, and an end deciding part 234.

The address converting part 231 acquires the write basic information from the module core 5. As described above, the notice issued in the output of data on the end edge of the pixel line PL by the module core 5 may be acquired through the asynchronous pulse part 203 in place of the information about the number of the output blocks in the image horizontal direction H, for instance.

The address converting part 231 controls the reading of the data from the write buffer 210 based on the basic information which is acquired. Specifically, the address converting part 231 collects data on the output block at each time which is stored in the write line FIFO part as shown in FIG. 15 in order to perform a burst transfer as shown in FIG. 16. Moreover, the address converting part 231 sets a start address and an end address of a write destination area on the DRAM 11 which is a storage destination for the write target data thus collected.

The write target data and the write destination area are inputted to the write arbiter 3W together with a write request. Then, the write DMAC 4W burst performs a burst transfer of the write target data to the write destination area acquired through the write arbiter 3W.

The write managing part 230 determines the write target data and the write destination area every write line FIFO part, and the determination is performed in accordance with a predetermined writing condition. The writing condition will be described below.

Moreover, the address converting part 231 issues read control for the write buffer 210 in response to a write request at each time. The read control is inputted to the synchronous FIFO part 232 and is utilized when the write target data is fetched from the write buffer 210.

Furthermore, the address converting part 231 inputs a data size of the write destination area to the synchronous FIFO part 233 in response to the write request at each time. The data size is utilized for detecting the end of the writing in response to the write request at each time in the end deciding part 234. Specifically, the end deciding part 234 counts the number of bytes of data to be transferred to the DRAM 11 through the write arbiter 3W from the write buffer 210, decides that the writing of desirable write target data is ended based on the fact that the count value is coincident with the data size inputted to the synchronous FIFO part 233, and inputs a notice to the write arbiter 3W.

In addition, if the address converting part 231 decides that a write request for all the output image data is issued, it inputs a result of the decision to the synchronous FIFO part 233. The end deciding part 234 knows that the writing for the whole output image data is ended based on the fact that a result of the decision is acquired from the synchronous FIFO part 233, and inputs the notice to the write arbiter 3W.

<Effect Obtained by Write I/F Circuit 6W>

The write I/F circuit 6W stores a plurality of output blocks to the write buffer 210, and collects and burst transfers them to the DRAM 11. Accordingly, as compared with the structure in which an output block is transferred to the DRAM 11 every time the output block is outputted from the module core 5, a frequency of a write request through each image processing module part 2 can be suppressed. Consequently, it is possible to efficiently utilize a bus band.

With the suppression of the frequency of the write request issued by each image processing module part 2, moreover, there is reduced a necessity for causing the write arbiter 3W to perform band adjustment to be performed by an existing so-called bus arbiter. Accordingly, a simpler algorithm than the bus arbiter can be employed for the write arbiter 3W. As a result, it is possible to constitute the write arbiter 3W on a small scale.

<Writing of Data Through Write I/F Circuit 6W>

The write I/F circuit 6W monitors whether an amount of storage of unwritten data (which have not been written to the DRAM 11) for each write line FIFO part exceeds a predetermined threshold or not, when the amount of storage of unwritten data exceeds the predetermined threshold, the write I/F circuit 6W selects the unwritten data as write target data and issues a write request.

The predetermined threshold is basically a maximum transfer amount which can be set through a single burst transfer. In other words, there is applied a condition (the write size condition) that the write target data is set to the maximum transfer amount. According to the write size condition, it is possible to efficiently perform a data transfer. Moreover, the frequency of the write request is suppressed with enhancement in the efficiency of the data transfer. Therefore, it is possible to reduce the processing load of the write arbiter 3W.

In the case where the unwritten data reaches the end edge of the pixel line in the output image which is outputted from the module core 5, it is preferable to divide the write target data within a range up to the core output data corresponding to the end edge and to set a write destination area corresponding to the divided range (that is, a size of such write target data) (the line end edge condition). Consequently, an unnecessary transfer operation can be suppressed for the writing of a line end edge side part. Accordingly, it is possible to efficiently utilize the bus band.

In the same manner as the read I/F circuit 6R, moreover, it is preferable to take the address alignment of the DRAM 11 into consideration. Specifically, there is employed the condition (the write alignment condition) that the write destination area in the DRAM 11 is adapted to the address alignment boundary of the DRAM 11. According to the write alignment condition, it is possible to operate the DRAM 11 more efficiently as compared with the case where the write destination area is provided across the address alignment boundary of the DRAM 11. Consequently, it is possible to contribute to enhancement in data transfer efficiency, electric power saving, and the like.

<Variant 1>

There has been described the case where the number of the storage areas 112 in the line FIFO part 111 is a double of the maximum number of times (16 times in AXI) of the data transfer which can be set in the signal burst transfer. However, the present invention is not restricted to this example.

Specifically, the number of the storage areas 112 of the line FIFO part 111 may be larger than the maximum number (16 times in the AXI) of the data transfer which can be set in the single burst transfer and be smaller than a double thereof. In this case, the capacity of the line FIFO part 111 is larger than the maximum transfer amount which can be set in the single burst transfer and is smaller than the double.

Also in the design, it is preferable to store, in the line FIFO part 111, new data read from the DRAM 11 in place of data supplied to the module core 5 based on the fact that a volume of the supplied data is equal to or larger than the maximum transfer amount of the burst transfer. According to this example, it is possible to reduce the capacity of the read buffer 110. As a result, it is possible to implement reduction in a chip area, decrease in a size of the apparatus, electric power saving, and the like.

The change can also be applied to the write buffer 210.

<Variant 2>

There has been described the case where the macroblock MB is set to the eight pixel lines PL and the read buffer 110 is constituted by the eight line FIFO parts 111 and the burst length is 16 times. On the other hand, in the case where the macroblock MB corresponds to 16 pixel lines PL, for instance, it is possible to prepare 16 line FIFO parts 111 by dividing the line FIFO part 111 into two parts and utilizing them. In this case, the burst length is limited to eight times at a maximum. According to the method, it is possible to flexibly cope with the macroblocks MB having various sizes without increasing the capacity of the read buffer 110.

The change can also be applied to the write buffer 210.

<Variant 3>

There has been described the case where the single image data is set to be a processing target. On the other hand, it is also possible to process a plurality of image data in parallel while switching them. For instance, there is taken an example in which common macroblocks MB set to the same position on an image are processed in parallel while image data for respective Y, U and V components are switched.

<Variant 4>

The image processing apparatus according to the present invention or the like can be provided on a digital camera, for instance. However, the present invention is not restricted to this example.

<Variant 5>

While the invention has been shown and described in detail, the foregoing description is in all aspects illustrative and not restrictive. It is therefore understood that numerous modifications and variations can be devised without departing from the scope of the invention.

What is claimed is:

1. An image processing apparatus comprising:
a plurality of image processing circuits, each including a module core circuit configured to execute predetermined image processing;
a module arbiter circuit directly connected to said plurality of image processing circuits and configured to communicate over a bus that is configured to be directly connected to a memory and a central processing unit and to arbitrate memory access over said bus which is given by said plurality of image processing circuits; and
a DMAC (Direct Memory Access Controller) circuit directly connected to said module arbiter circuit and directly connected to said bus and configured to execute said memory access related to an arbitration result obtained by said module arbiter circuit.

2. The image processing apparatus according to claim 1, wherein said memory access includes a read request for reading input image data to be processed by said module core circuit from an image supply source memory connected to said bus,
said module arbiter circuit is configured to arbitrate said read requests issued by said plurality of image processing circuits,
said DMAC circuit includes a read DMAC circuit configured to transfer said input image data in accordance with said arbitration result by utilizing a burst transfer,
said module core circuit is configured to accept said input image data on a unit of an input block having a predetermined size,
each of said plurality of image processing circuits further includes a read interface circuit having a read buffer for storing data read from said image supply source memory, said read interface circuit being configured to manage a data transfer from said image supply source memory to said read buffer and to supply data stored in said read buffer to said module core circuit on said input block unit, and
said read interface circuit is configured to manage reading of said input image data in such a manner that a plurality of input blocks is stored in said read buffer and to determine a read target area on said image supply source memory in accordance with a predetermined reading condition in such a manner that said input image data is transferred by burst transfer.

3. The image processing apparatus according to claim 2, wherein said input image data includes a plurality of input image data rows each corresponding to a pixel line or a pixel line group,
said input block is set with N (N is an integer of 2 or more) input image data rows in said plurality of input image data rows used as a target,
said read buffer includes N read line FIFO (First In First Out) parts to which said N input image data rows corresponding to said input block are inputted respectively, and
said predetermined reading condition includes:
a cyclic selecting condition that each data row among said N input image data rows is cyclically selected;
an intra-row order condition that said read target area is set in order from a head side of the input image data row; and
a frequency condition that said read target area is set to said each data row among said N input image data rows once every cyclic selection.

4. The image processing apparatus according to claim 2, wherein said input image data includes a plurality of input image data rows each corresponding to a pixel line or a pixel line group,
said input block is set with a single input image data row of said plurality of input image data rows used as a target,
said read buffer includes a single read line FIFO (First In First Out) part to which said single input image data row corresponding to said input block is inputted, and
said predetermined reading condition includes an intra-row order condition that said read target area is set in order from a head side of the input image data row.

5. The image processing apparatus according to claim 2, wherein said predetermined reading condition includes a reading alignment condition that an end address of said read target area is adapted to an address alignment boundary of said image supply source memory.

6. The image processing apparatus according to claim 5, wherein said predetermined reading condition includes a read size condition that a start address of said read target area is set in such a manner that a data volume of said read target area is a multiple of a bus width of said bus if said read target area contains a start edge of said input image data row.

7. The image processing apparatus according to claim 6, wherein said predetermined reading condition includes:
a first end address condition that an end address of said read target area is set in adaptation to a maximum transfer amount which can be set by a single burst transfer if an unread part in said input image data row exceeds said maximum transfer amount of said single burst transfer and if an amount of excess is larger than a difference between said start address set on said read size condition and a head address of said input image data row; and
a second end address condition that said end address of said read target area is set to an end edge address of said input image data row if said amount of excess is equal to or smaller than said difference.

8. The image processing apparatus according to claim 2, wherein said predetermined reading condition includes a third end address condition that an end address of said read target area is set to be an end edge address of said input image data row if an unread part of said input image data row is equal to or smaller than said maximum transfer amount of said burst transfer.

9. The image processing apparatus according to claim 2, wherein said read buffer includes at least one read line FIFO (First In First Out) part having a capacity which is larger than said maximum transfer amount of said burst transfer and is smaller than twice said maximum transfer amount of said burst transfer, and said read interface circuit is configured to store, in said read line FIFO part, new data read from said image supply source memory in place of supplied data to said module core circuit if said supplied data is equal to or larger than said maximum transfer amount in said read line FIFO part.

10. The image processing apparatus according to claim 1, wherein said memory access includes a write request for writing core output data to be outputted from said module core circuit to an image storage destination memory connected to said bus, said module arbiter circuit is configured to arbitrate said write requests issued by said plurality of image processing circuits, said DMAC circuit includes a write DMAC circuit for transferring said core output data in accordance with said arbitration result by utilizing a burst transfer, each of said plurality of image processing circuits further includes a write interface circuit having a write buffer for storing said core output data, said write interface circuit being configured to manage an input of said core output data to said write buffer and to manage a transfer of data stored in said write buffer to said image storage destination memory, said write buffer includes at least one write line FIFO (First In First Out) part having a larger capacity than a maximum transfer amount which can be set by a single burst transfer, and said write interface circuit is configured to determine write target data to be a target of said burst transfer in data in said write line FIFO part and a write destination area on said image storage destination memory in accordance with a predetermined writing condition every write line FIFO part.

11. The image processing apparatus according to claim 10,
wherein said predetermined writing condition includes at least one of:
a writing size condition that said write target data is set to said maximum transfer amount of said burst transfer; and
a write alignment condition that said write destination area is adapted to an address alignment boundary of said image storage destination memory.

12. The image processing apparatus according to claim 10,
wherein said predetermined writing condition includes a line end edge condition that if an unwritten data reaches an end edge of a pixel line or a pixel line group of an output image to be outputted from said module core circuit, said write target data is set within a range up to said core output data corresponding to said end edge, and said write destination area is set corresponding to said range.

13. The image processing apparatus according to claim 10,
wherein said write line FIFO part has a capacity which is larger than said maximum transfer amount of said burst transfer and is smaller than twice said maximum transfer amount of said burst transfer, and
said write interface circuit is configured to store, in said write line FIFO part, new core output data in place of transferred data to said image storage destination memory if said transferred data is equal to or larger than said maximum transfer amount in said write line FIFO part.

14. An image processing interface circuit to be connected to a module core circuit configured to execute a predetermined image processing, comprising:
a read buffer for storing data read from an image supply source memory connected to a bus that is configured to be connected to said image supply source memory and a central processing unit; and
circuitry configured to
communicate over said bus;
manage a data transfer from said image supply source memory to said read buffer over said bus; and
supply data stored in said read buffer to said module core circuit on a unit of an input block having a predetermined size,
wherein said circuitry is configured to
manage reading of input image data to be processed by said module core circuit in such a manner that a plurality of input blocks is stored in said read buffer; and
determine a read target area on said image supply source memory in accordance with a predetermined reading condition in such a manner that said input image data is transferred by burst transfer from said image supply source memory to said read buffer over said bus,
wherein said input image data includes a plurality of input image data rows each corresponding to a pixel line or a pixel line group,
said input block is set with N (N is an integer of 2 or more) input image data rows in said plurality of input image data rows used as a target,
said read buffer includes N read line FIFO (First In First Out) parts to which said N input image data rows corresponding to said input block are input respectively,
said N input image data rows are read partially in parallel, and
said predetermined reading condition includes:
a cyclic selecting condition that each data row among said N input image data rows is cyclically selected;
an intra-row order condition that said read target area is set in order from a head side of said input image data row; and
a frequency condition that said read target area is set to said each data row among said N input image data rows once every selection.

15. The image processing interface circuit according to claim 14,
wherein if said input block is set with a single input image data row of said plurality of input image data rows used as a target, said circuitry is configured to determine said read target area on said image supply source memory in accordance with said intra-row order condition.

16. The image processing interface circuit according to claim 14,
wherein said predetermined reading condition includes a reading alignment condition that an end address of said read target area is adapted to an address alignment boundary of said image supply source memory.

17. The image processing interface circuit according to claim 16,
wherein said predetermined reading condition includes a read size condition that a start address of said read target area is set in such a manner that a data volume of said read target area is a multiple of a bus width of said bus if said read target area contains a start edge of said input image data row.

18. The image processing interface circuit according to claim 17,
wherein said predetermined reading condition includes:
a first end address condition that an end address of said read target area is set in adaptation to a maximum transfer amount which can be set by a single burst transfer if an unread part in said input image data row exceeds said maximum transfer amount of said single burst transfer and if an amount of excess is larger than a difference between said start address set on said read size condition and a head address of said input image data row; and
a second end address condition that said end address of said read target area is set to an end edge address of said input image data row if said amount of excess is equal to or smaller than said difference.

19. The image processing interface circuit according to claim 14,
wherein said predetermined reading condition includes a third end address condition that an end address of said read target area is set to be an end edge address of said input image data row if an unread part of said input image data row is equal to or smaller than said maximum transfer amount of said burst transfer.

20. The image processing interface circuit according to claim 14,
wherein said read buffer includes at least one read line FIFO (First In First Out) part having a capacity which is larger than said maximum transfer amount of said burst transfer and is smaller than twice said maximum transfer amount of said burst transfer, and
said circuitry is configured to store, in said read line FIFO part, new data read from said image supply source memory in place of supplied data to said module core circuit if said supplied data is equal to or larger than said maximum transfer amount in said read line FIFO part.

21. An image processing interface circuit to be connected to a module core circuit configured to execute a predetermined image processing, comprising:
a write buffer for storing core output data to be outputted from said module core circuit; and
circuitry configured to
manage an input of said core output data to said write buffer; and
manage a transfer of data stored in said write buffer to an image storage destination memory connected to a bus,
wherein said write buffer includes at least one write line FIFO (First In First Out) part having a larger capacity than a maximum transfer amount which can be set by a single burst transfer, and
said circuitry is configured to determine write target data to be a target of said burst transfer in data in said write line FIFO part and a write destination area on said image storage destination memory in accordance with a predetermined writing condition every write line FIFO part,
wherein said predetermined writing condition includes a line end edge condition that if an unwritten data reaches an end edge of a pixel line or a pixel line group of an output image to be output from said module core circuit, said write target data is set within a range up to said core output data corresponding to said end edge, and said write destination area is set corresponding to said range.

22. The image processing interface circuit according to claim 21,
wherein said predetermined writing condition includes at least one of:
a writing size condition that said write target data is set to said maximum transfer amount of said burst transfer; and
a write alignment condition that said write destination area is adapted to an address alignment boundary of said image storage destination memory.

23. The image processing interface circuit according to claim 21,
wherein said write line FIFO part has a capacity which is larger than said maximum transfer amount of said burst transfer and is smaller than twice said maximum transfer amount of said burst transfer, and
said circuitry is configured to store, in said write line FIFO part, new core output data in place of transferred data to said image storage destination memory if said transferred data is equal to or larger than said maximum transfer amount in said write line FIFO part.

* * * * *

UNITED STATES PATENT AND TRADEMARK OFFICE
CERTIFICATE OF CORRECTION

PATENT NO. : 9,552,619 B2
APPLICATION NO. : 13/854340
DATED : January 24, 2017
INVENTOR(S) : Shogo Iwai et al.

It is certified that error appears in the above-identified patent and that said Letters Patent is hereby corrected as shown below:

On the Title Page

Item (71), the Applicants' information is incorrect. Item (71) should read:

--(71) Applicants: MegaChips Corporation, Osaka-shi (JP)
                     Nikon Corporation, Chiyoda-ku (JP)--

Signed and Sealed this
Twenty-seventh Day of February, 2018

Andrei Iancu
*Director of the United States Patent and Trademark Office*